(12) United States Patent
Tadayon et al.

(10) Patent No.: US 12,007,463 B2
(45) Date of Patent: Jun. 11, 2024

(54) SENSING-ASSISTED POSITIONING OF MOBILE DEVICES

(71) Applicants: Navid Tadayon, Kanata (CA); Alireza Bayesteh, Ottawa (CA); Jianglei Ma, Ottawa (CA)

(72) Inventors: Navid Tadayon, Kanata (CA); Alireza Bayesteh, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 782 days.

(21) Appl. No.: 16/939,579

(22) Filed: Jul. 27, 2020

(65) Prior Publication Data

US 2024/0069183 A1  Feb. 29, 2024

(51) Int. Cl.
 *G01S 13/06* (2006.01)
 *H04W 64/00* (2009.01)

(52) U.S. Cl.
 CPC .............. *G01S 13/06* (2013.01); *H04W 64/00* (2013.01)

(58) Field of Classification Search
 CPC ... H04W 64/00; H04W 64/006; H04W 16/14; H04W 4/029; H04W 4/027; H04W 4/80;
 (Continued)

(56) References Cited

U.S. PATENT DOCUMENTS 7,298,327 B2 * 11/2007 Dupray ................. G01S 5/0278
 342/451
7,525,484 B2 * 4/2009 Dupray ................. G01S 5/0009
 342/450
(Continued)

FOREIGN PATENT DOCUMENTS

| CN | 109964141 A | 7/2019 |
| CN | 110958685 A | 4/2020 |
| CN | 111132307 A | 5/2020 |

OTHER PUBLICATIONS

A. Shahmansoori, G. E. Garcia, G. Destino, G. Seco-Granados, and H. Wymeersch, "5G position and orientation estimation through millimeter wave MIMO," in Proc. IEEE Globecom Wkshps, pp. 1-6, Dec. 2015.
(Continued)

*Primary Examiner* — Vladimir Magloire
*Assistant Examiner* — Michael W Justice

(57) ABSTRACT

Some embodiments of the present disclosure provide a location management function that receives, from a sensor system, a sensing-based profile that includes a sensing-based observation of a UE and receives, from a communication system, a reference-signal-based observation of the UE. The location management function may derive, from the sensing-based observation, a position hypothesis and may determine, from the reference-signal-based observation, UE identity information for the UE. By processing the reference-signal-based observation in conjunction with the sensing-based observation, the location management function may determine an association between the sensing-based observation and the reference-signal-based observation. The location management function may then transmit, to the UE having the UE identity information determined from the reference-signal-based observation, an indication of the position hypothesis derived from the sensing-based observation.

20 Claims, 19 Drawing Sheets

(58) Field of Classification Search
CPC ...... G01S 13/88; G01S 13/003; G01S 13/765; G01S 13/46; G01S 13/584; G01S 13/06; G01S 2013/0245; G01S 2013/9316
USPC ...... 455/456.1; 342/357.52, 357.29, 450, 58, 342/59
See application file for complete search history.

(56) References Cited

U.S. PATENT DOCUMENTS

| | | | | |
|---|---|---|---|---|
| 7,764,231 | B1* | 7/2010 | Karr | H04W 4/025 342/453 |
| 8,032,153 | B2* | 10/2011 | Dupray | G01S 5/0257 455/457 |
| 8,072,311 | B2* | 12/2011 | Sadr | G01S 5/12 340/539.22 |
| 8,477,830 | B2* | 7/2013 | Myers | H04J 13/0029 375/150 |
| 8,810,779 | B1* | 8/2014 | Hilde | G01S 7/487 356/3.01 |
| 9,035,774 | B2* | 5/2015 | Scott | G01S 13/9004 340/572.1 |
| 9,060,341 | B2* | 6/2015 | Karr | G01S 5/0244 |
| 9,143,881 | B2* | 9/2015 | Fan | G06Q 20/3224 |
| 9,148,867 | B2* | 9/2015 | Nakata | G08G 1/0112 |
| 9,204,798 | B2* | 12/2015 | Proud | A61B 5/0024 |
| 9,237,543 | B2* | 1/2016 | Karr | G01S 1/026 |
| 9,277,519 | B1* | 3/2016 | Pu | H04L 27/2686 |
| 9,277,525 | B2* | 3/2016 | Dupray | G01S 5/0278 |
| 9,820,272 | B1* | 11/2017 | Parvazi | H04L 27/2662 |
| 9,992,686 | B2* | 6/2018 | Byun | H04W 16/08 |
| 10,127,412 | B2* | 11/2018 | Sadr | G01S 5/145 |
| 10,412,699 | B1* | 9/2019 | Blaha, Jr. | H04W 64/00 |
| 10,517,063 | B2* | 12/2019 | Blaha, Jr. | G06F 16/29 |
| 10,684,350 | B2* | 6/2020 | Dupray | G01S 19/46 |
| 10,798,539 | B2* | 10/2020 | Marschalkowski | G01S 13/878 |
| 10,917,736 | B2* | 2/2021 | Tammam | H04R 5/04 |
| 10,984,660 | B2* | 4/2021 | Hegranes | G08G 5/0026 |
| 11,205,347 | B2* | 12/2021 | Stählin | G01S 19/46 |
| 11,412,394 | B2* | 8/2022 | Rimini | G01S 7/006 |
| 11,474,235 | B2* | 10/2022 | Niesen | G01S 13/003 |
| 2001/0022558 | A1* | 9/2001 | Karr, Jr. | G01S 5/0278 342/450 |
| 2003/0222820 | A1* | 12/2003 | Karr | G01S 5/0009 342/457 |
| 2008/0113672 | A1* | 5/2008 | Karr | G01S 5/0054 455/456.1 |
| 2008/0167049 | A1* | 7/2008 | Karr | G01S 5/0278 455/456.2 |
| 2010/0039228 | A1* | 2/2010 | Sadr | G01S 5/12 340/10.1 |
| 2010/0234045 | A1* | 9/2010 | Karr | G01S 5/021 455/456.1 |
| 2012/0102409 | A1* | 4/2012 | Fan | G06Q 10/10 715/738 |
| 2012/0219037 | A1* | 8/2012 | Myers | H04J 13/0029 375/141 |
| 2012/0256730 | A1* | 10/2012 | Scott | G01S 13/9004 340/10.1 |
| 2013/0281115 | A1* | 10/2013 | Dupray | G01S 5/0244 455/456.1 |
| 2013/0285855 | A1* | 10/2013 | Dupray | H04W 4/029 342/451 |
| 2013/0310067 | A1* | 11/2013 | Nakata | G01S 13/931 455/456.1 |
| 2014/0247147 | A1* | 9/2014 | Proud | A61B 5/0024 340/870.02 |
| 2014/0266909 | A1* | 9/2014 | Palanki | G01S 5/0278 342/451 |
| 2015/0057919 | A1* | 2/2015 | Shoarinejad | G01S 7/003 342/146 |
| 2015/0219757 | A1* | 8/2015 | Boelter | G01S 13/68 701/519 |
| 2015/0373500 | A1* | 12/2015 | Chen | H04W 64/00 455/456.1 |
| 2016/0309298 | A1* | 10/2016 | Dupray | G01S 1/028 |
| 2017/0286730 | A1* | 10/2017 | Sadr | G06K 7/10099 |
| 2017/0311176 | A1* | 10/2017 | Byun | H04W 28/10 |
| 2017/0328995 | A1* | 11/2017 | Marschalkowski | H04W 4/33 |
| 2018/0203091 | A1* | 7/2018 | Robinson | G01S 7/021 |
| 2019/0053013 | A1* | 2/2019 | Markhovsky | H04L 43/0864 |
| 2019/0243994 | A1* | 8/2019 | Sadr | G06K 7/10128 |
| 2019/0349882 | A1* | 11/2019 | Blaha, Jr. | G06F 16/29 |
| 2019/0369233 | A1* | 12/2019 | Niesen | H04W 4/46 |
| 2020/0077221 | A1* | 3/2020 | Tammam | H04R 5/04 |
| 2020/0166598 | A1* | 5/2020 | Dorn | G01S 3/46 |
| 2020/0173808 | A1* | 6/2020 | Beaurepaire | G01C 21/3673 |
| 2020/0312159 | A1* | 10/2020 | Hegranes | H04B 7/18506 |
| 2020/0379079 | A1* | 12/2020 | Dupray | H04W 64/00 |
| 2021/0025975 | A1* | 1/2021 | Seeber | H04N 23/66 |
| 2021/0074151 | A1* | 3/2021 | Stählin | G08G 1/04 |
| 2021/0195435 | A1* | 6/2021 | Rimini | H04B 1/3838 |

OTHER PUBLICATIONS

J. Werner, M. Costa, A. Hakkarainen, K. Lepp¨anen, and M. Valkama, "Joint user node positioning and clock offset estimation in 5G ultradense networks," in Proc. IEEE Globecom, pp. 1-7, Dec. 2015.

Huawei, HiSilicon et al.,"Details of NR positioning techniques", 3GPP TSG RAN WG1 Meeting #94bis, Chengdu, China, Oct. 8-12, 2018, R1-1810152,total: 11 pages.

* cited by examiner

SENSING-ASSISTED POSITIONING OF MOBILE DEVICES

TECHNICAL FIELD

The present disclosure relates generally to positioning procedures for a mobile device and, in particular embodiments, to using sensing to assist in the positioning.

BACKGROUND

User Equipment (UE) position information is used in cellular communication networks to improve the various performance metrics for the network. Such performance metrics may, for example, include capacity, agility and efficiency. The improvement may be achieved when elements of the network exploit the position, the behavior, the mobility pattern, etc., of the UE in the context of a priori information describing a wireless environment in which the UE is operating. The a priori information can be gathered by a sensing system separate from the communication system. Alternatively, it could be advantageous to gather the a priori information using an integrated system, which reduces the hardware (and cost) in the system; however, building a radio frequency map of the wireless environment using the same hardware as the communication system is a highly challenging and open problem. The difficulty of the problem relates to factors such as the limited resolution of the communication system, the dynamicity of the environment, and the huge number of objects whose electromagnetic properties and position are to be estimated.

It is known to use UEs to assist in determining UE location. In downlink observed time difference of arrival (OTDOA), downlink signals from a serving base station and multiple neighbor base stations are received by the UE. Later, the UE determines time difference between arrival of the downlink signals. The UE sends time difference information to the base station. Based on the time difference information, the base station determines the position of the UE. OTDOA suffers from synchronization error due to a residual bias and skew when the transmit point and the receive point are different BSs. In uplink Time Difference of Arrival (U-TDOA) uplink transmissions from the UE are received, at a base station, by highly sensitive receivers. The receivers determine the time differences of arrival and, hence, UE position. U-TDOA is known to suffer from a time-stamping delay due to processing time being subject to variation.

Positioning accuracy using either OTDOA or U-TDOA depends on processing capabilities of the UE. Processing capabilities may include, for example, a sampling rate implemented at the UE.

SUMMARY

A location management function may combine sensing-based techniques with reference signal-based techniques to enhance position determination. The location management function may receive, from a sensor system, a sensing-based profile that includes a sensing-based observation of a UE and may receive, from a communication system, a reference-signal-based observation of the UE. The location management function may derive, from the sensing-based observation, a position hypothesis and may determine, from the reference-signal-based observation, UE identity information for the UE. By processing the reference-signal-based observation in conjunction with the sensing-based observation, the location management function may determine an association between the sensing-based observation and the reference-signal-based observation. The location management function may then transmit, to the UE having the UE identity information determined from the reference-signal-based observation, an indication of the position hypothesis derived from the sensing-based observation.

On the basis that, for aspects of the present application, the sensor system and the communication system are part of the same transmission point device, synchronization issues are obviated. Additionally, since the UE is not relied upon for baseband signal processing, limited UE baseband processing capabilities do not hinder aspects of the present application in the determination of a position hypothesis for the UE. When deriving, from the sensing-based observations, the position hypothesis the location management function may use Doppler analysis techniques to decouple echoes from mobile UEs and static clutter.

According to an aspect of the present disclosure, there is provided a method of indicating a location of a device to the device. The method includes obtaining, from a profile origin, a sensing-based profile including a sensing-based observation of the device, obtaining a reference-signal-based observation and transmitting, to a device associated with device identity information, an indication of a position hypothesis based on an association between the position hypothesis and the device identity information. The position hypothesis is derived from the sensing-based observation. The device identity information for the device is determined from the reference-signal-based observation. The reference-signal-based observation is processed in conjunction with the sensing-based observation to, thereby, determine the association between the position hypothesis and the device identity information. Additionally, aspects of the present application provide an apparatus for carrying out this method and a computer-readable medium for causing a processor to carry out this method.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
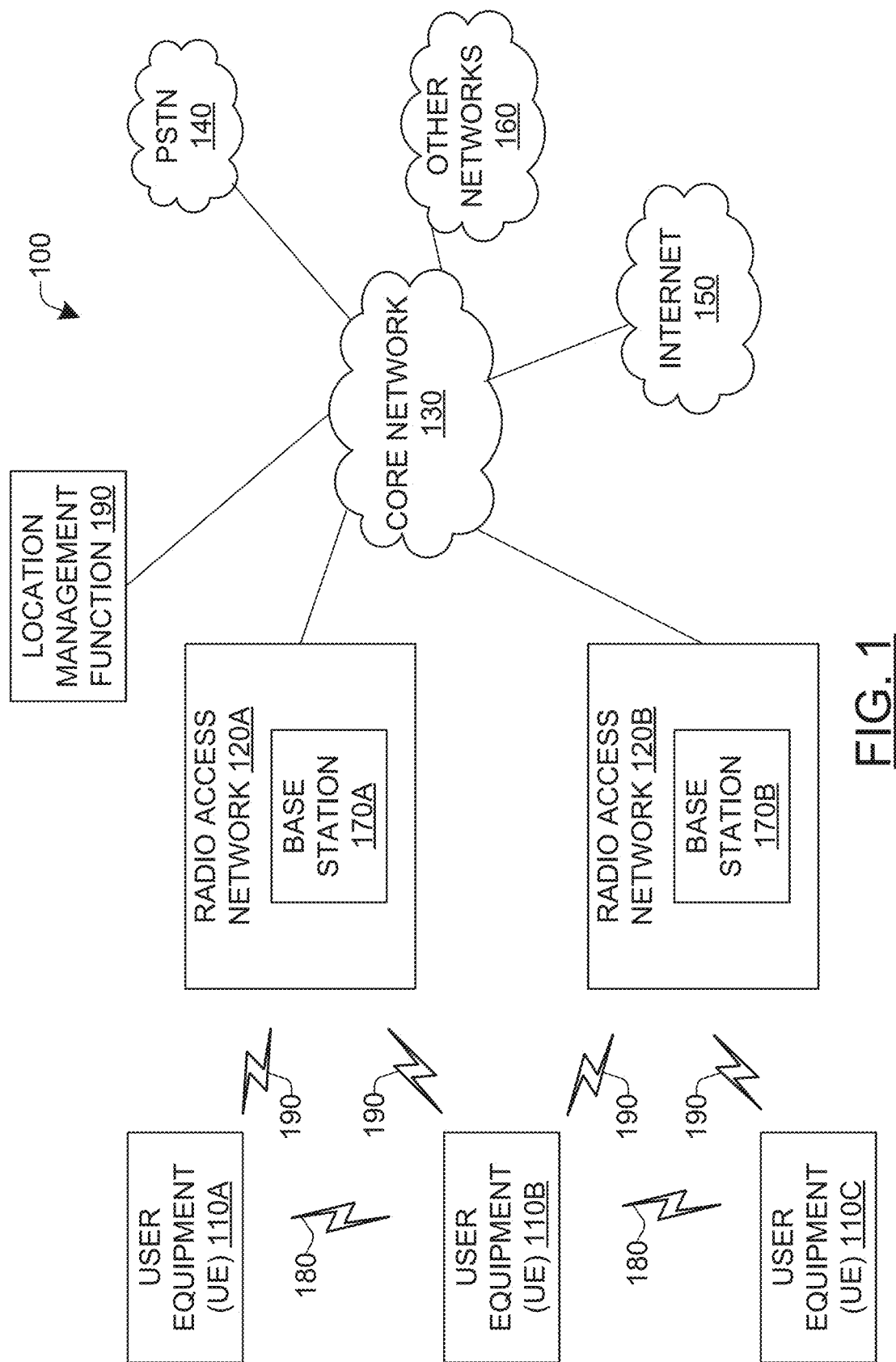
FIG. 1 illustrates, in a schematic diagram, a communication system in which embodiments of the disclosure may occur, the communication system includes example user equipments, example base stations and an example location management function.

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

While current communication systems are equipped to broadly estimate locations of UEs, it is desirable for future networks to be able to determine a position for a UE with centimeter-level accuracy and ultra-high robustness. Beyond location information, pose information is also desired. "Pose" information is information about a velocity and orientation (attitude) of the UE. There are several factors that make it challenging to obtain accurate UE location and pose information. First, there are impairments imposed by terrestrial wireless channels, such as multipath interference and shadowing. These impairments may be considered detrimental to obtaining accurate pose information. Second, interference from neighboring cells (due to frequency reuse) may be shown to manifest itself in the form of additive noise, with both short-term and long-term dependencies. Such interference may be shown to have an effect on the accuracy of the location estimate. Third, the accuracy of the location estimate is further limited by restrictions on a maximum power that the communications system can radiate, due to regulatory caps on allowable electromagnetic (EM) radiation. Fourth, the accuracy of the location estimate is even further limited by bandwidth limitations of the whole system.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a first radio access network (RAN) 120A and a second RAN 120B (individually or collectively 120), a core network 130, a public switched telephone network (PSTN) 140, the Internet 150, other networks 160 and location management function 190. Each UE 110 may, more broadly, be called an electronic device. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the first RAN 120A includes a first base station 170A and the second RAN includes a second base station 170B (individually or collectively 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some, or all, of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 180 using wireless communication links, e.g., radio frequency (RF) wireless communication links, microwave wireless communication links, infrared (IR) wireless communication links, visible light (VL) communications links, etc. The air interfaces 180 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA) or single-carrier FDMA (SC-FDMA) in the air interfaces 180.

A base station 170 may implement Universal Mobile Telecommunication System (UMTS) Terrestrial Radio Access (UTRA) to establish the air interface 180 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 180 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 180 over which the UEs 110 communicate with one or more of the base stations 170 or they may be substantially different. For example, the communication system 100 may implement one or more channel access methods, such as CDMA, TDMA, FDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
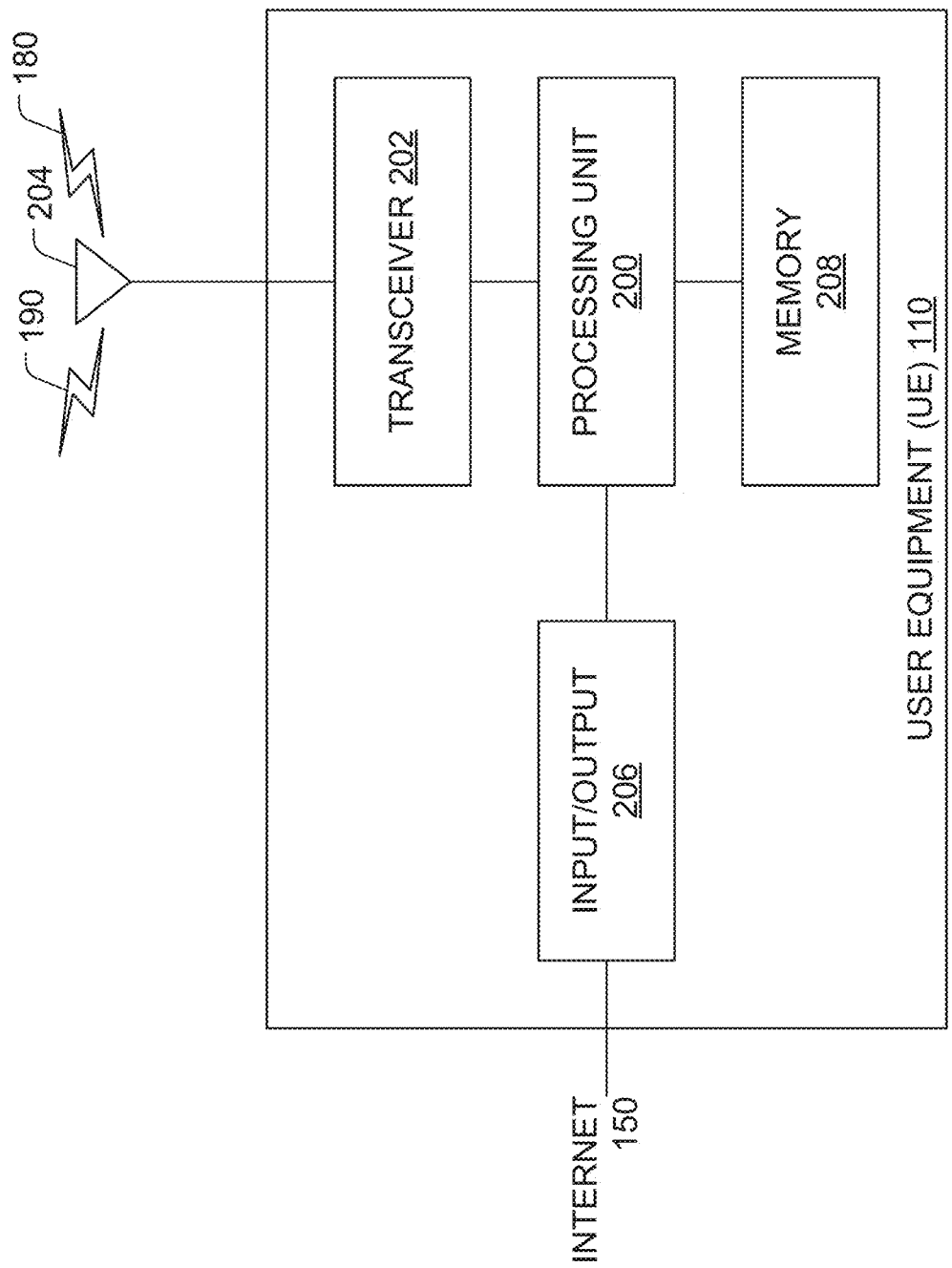
FIG. 2 illustrates, in a block diagram, an example user equipment of the communication system of FIG. 1, in accordance with aspects of the present application.
Figure 3:
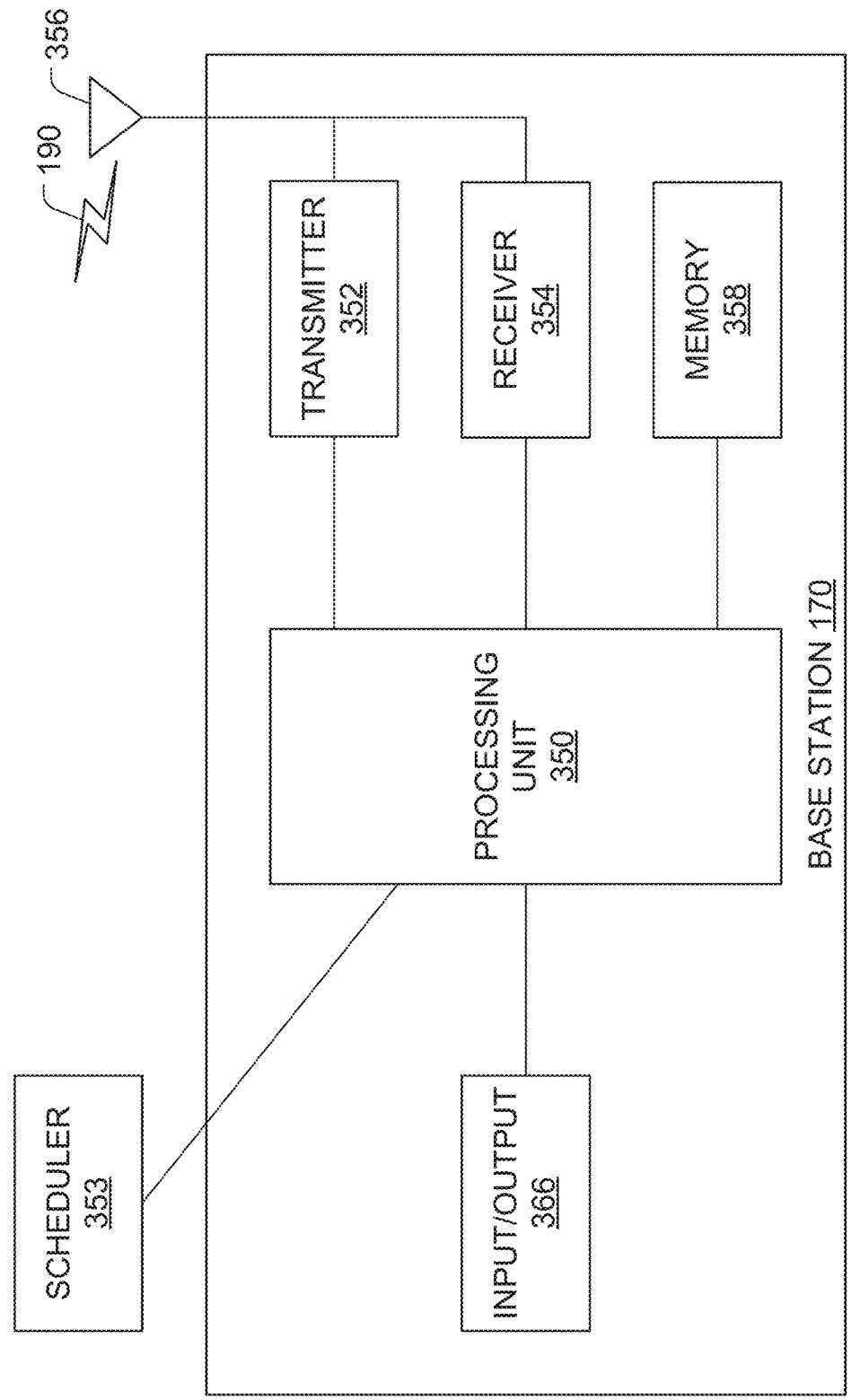
FIG. 3 illustrates, in a block diagram, an example base station of the communication system of FIG. 1, in accordance with aspects of the present application.
Figure 4:
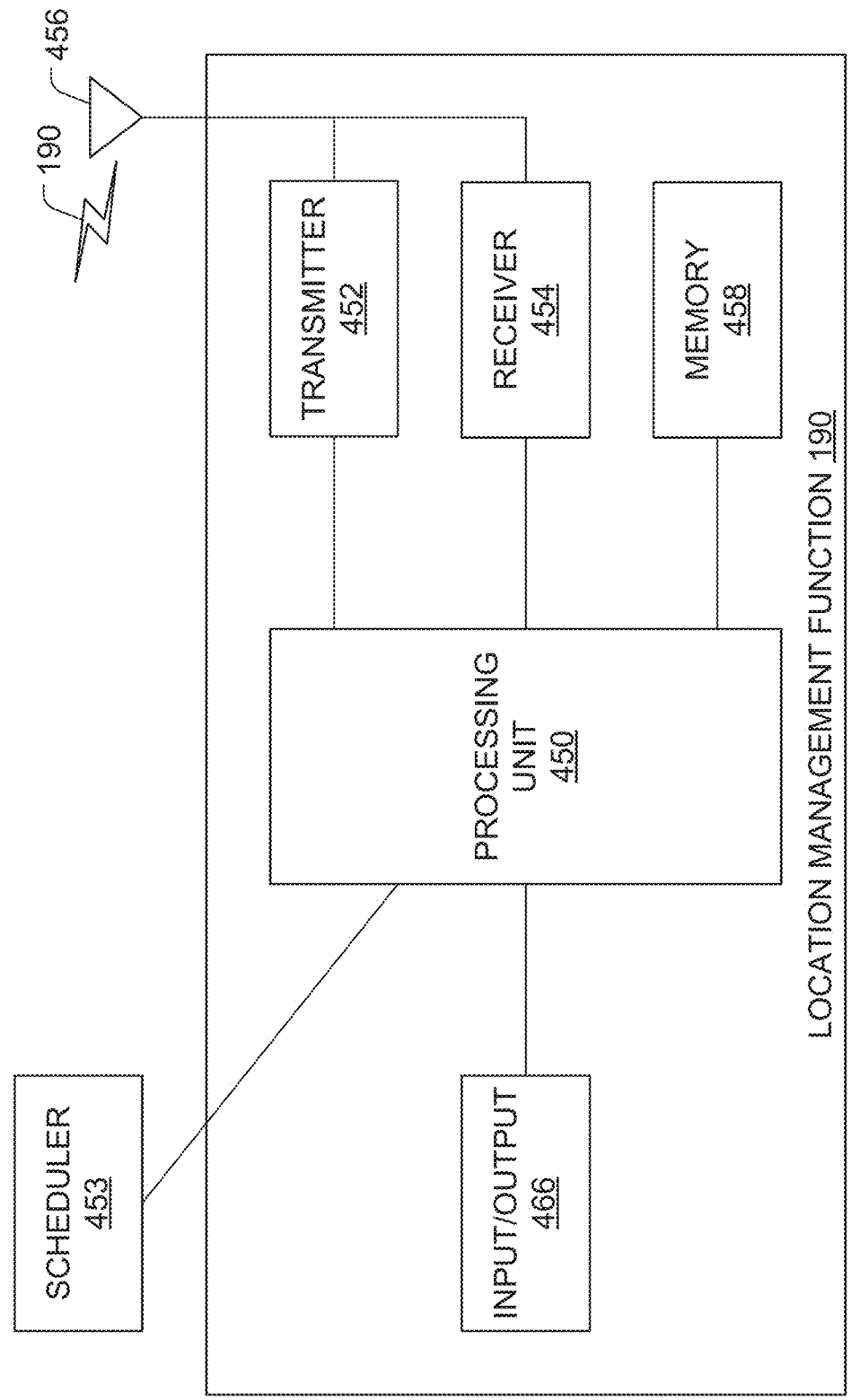
FIG. 4 illustrates, in a block diagram, an example location management function of the communication system of FIG. 1, in accordance with aspects of the present application.

FIGS. 2, 3 and 4 illustrate example devices that may implement the methods and teachings according to this disclosure. In particular, FIG. 2 illustrates an example UE 110, FIG. 3 illustrates an example base station 170 and FIG. 4 illustrates an example location management function 190. These components could be used in the communication system 100 of FIG. 1 or in any other suitable system.

As shown in FIG. 2, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 350, at least one transmitter 352, at least one receiver 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the UE 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

In some aspects of the present application, the location management function ("LMF") 190 may be implemented as a physically independent entity located at the core network 130 with connection to the multiple BSs 170. In other aspects of the present application, the LMF 190 may be implemented as a logical entity co-located inside a BS 170 through logic carried out by the processing unit 350.

As shown in FIG. 4, the LMF 190, when implemented as a physically independent entity, includes at least one processing unit 450, at least one transmitter 452, at least one receiver 454, one or more antennas 456, at least one memory 458, and one or more input/output devices or interfaces 466. A transceiver, not shown, may be used instead of the transmitter 452 and receiver 454. A scheduler 453 may be coupled to the processing unit 450. The scheduler 453 may be included within or operated separately from the LMF 190. The processing unit 450 implements various processing operations of the LMF 190, such as signal coding, data processing, power control, input/output processing, or any other functionality. The processing unit 450 can also be configured to implement some or all of the functionality and/or embodiments described in more detail above. Each processing unit 450 includes any suitable processing or computing device configured to perform one or more operations. Each processing unit 450 could, for example, include a microprocessor, microcontroller, digital signal processor, field programmable gate array, or application specific integrated circuit.

Each transmitter 452 includes any suitable structure for generating signals for wireless or wired transmission to one or more UEs or other devices. Each receiver 454 includes any suitable structure for processing signals received wirelessly or by wire from one or more BSs 170, UEs 110 or other devices. Although shown as separate components, at least one transmitter 452 and at least one receiver 454 could be combined into a transceiver. Each antenna 456 includes any suitable structure for transmitting and/or receiving wireless or wired signals. Although a common antenna 456 is shown here as being coupled to both the transmitter 452 and the receiver 454, one or more antennas 456 could be coupled to the transmitter(s) 452, and one or more separate antennas 456 could be coupled to the receiver(s) 454. Each memory 458 includes any suitable volatile and/or non-volatile storage and retrieval device(s) such as those described above in connection to the UE 110. The memory 458 stores instructions and data used, generated, or collected by the LMF 190. For example, the memory 458 could store software instructions or modules configured to implement some or all of the functionality and/or embodiments described above and that are executed by the processing unit(s) 450.

Each input/output device 466 permits interaction with a user or other devices in the network. Each input/output device 466 includes any suitable structure for providing information to or receiving/providing information from a user, including network interface communications.

The term RADAR is formed from letters in the phrase Radio Azimuth Direction and Ranging. However, the term RADAR need not always be expressed in all caps; "RADAR," "Radar" and "radar" are equally valid. Radar is typically used for detecting a presence and a location of an object. A system using one type of radar, called "pulsed radar," radiates a pulse of energy and receives echoes of the pulse from one or more targets. The system determines the pose of a given target based on the echoes returned from the given target. A system using another type of radar, called "pulse-compression radar," uses the same amount of energy as is used in the pulsed radar system. However, in the pulse-compression radar system, the energy is spread in time and in frequency to reduce the instantaneous radiated power.

Given that radar systems are often used for space-borne applications, a free-space channel model may be used to approximate (i.e., ignoring impairments such as multipath propagation and shadowing) the operation of the radar system. It follows that, in a free-space channel model, a radar system may radiate a pulse with enough power that the echoes that are received have a power sufficient to a task of estimating characteristics of moving targets. Such characteristics may include, for example, velocity and location.

In terrestrial applications, multipath propagation and shadowing are dominant impairments. Since these impairments degrade the echo, pose estimation is rendered difficult. Mobile device users and vehicles are known to have insignificant Radar Cross Sections (RCSs). Consequently, weak echoes from mobile device users and vehicles are often not sensed by inherently noisy commercial radar receivers in the presence of stronger echoes received from clutter with more significant RCSs.

Another challenge with using radar systems for terrestrial applications, as opposed to air-borne applications, is the problem of identifiability. In air-borne applications, the moving targets, such as airplanes, fighter jets and missiles, have distinct attributes, thereby making the targets distinguishable from each other only based on the return echoes of the pulses. For instance, a civilian aircraft has a larger radar cross section than a fighter jet. Additionally, the civilian aircraft generally travels at a lower speed and with less maneuverability than the fighter jet. Furthermore, missiles generally travel at a velocity three times the velocity of the fastest airplanes.

A terrestrial radar system may be given the task of determining a location for each UE 110 among hundreds of UEs 110 within a cell. The echoes from the UEs 110, assuming a detectable strength, do not, generally, allow for distinctions between the UEs 110. The objective of an air-borne radar system may be considered to be binary, in that the target may either be a friend or a foe. In contrast, a terrestrial radar system, given the task of determining a location for many UEs 110, has an objective that may be classed as a multi-hypothesis testing problem.

From a different perspective, target identifiability can be cast as a problem of associating observations to targets. Such an association problem is inherent to any passive remote sensing system, of which radar is one.

The impediments to pose estimation include system complexity and non-cooperativeness. Non-cooperativeness relates to the traditional intent of radar systems, that is, to sense targets that are non-cooperative in nature, such as: a missile; a car travelling faster than a speed limit; a celestial object; or a fighter jet. When the targets are active, meaning, the targets are capable of receiving and responding to the radar signal and the targets are willing to cooperate, it may be considered that identifiability is less of a problem. For instance, UEs 110 in a cellular network may be obliged to cooperate with elements of the cellular network or may be obliged to follow some guidelines that have been established for the cellular network. Unfortunately, when active pose estimation benefits from cooperativeness, active pose estimation suffers from system complexity.

The system complexity impediment to pose estimation includes problems as diverse as those problems related to synchronization problems and those problems related to limited spectral/spatial resolution of the targets. Synchronization problems can be expressed as problems related to the receiving end of the sensing signal not precisely knowing the time and frequency references of the transmitting end of the sensing signal. Notably, in a mono-static radar setting, both the transmitting node and the receiving node are run by the same clock, the time references are inherently the same. Even in a bi-static setting or a multi-static setting, where a transmitter of a sensing signal and a receiver of the sensing signal are not co-located, the problem of synchronization can be solved through frequent and accurate clock calibrations. Such calibrations are realizable by high-speed and low-latency backhaul links between the transmitter and the receiver. Achieving perfect synchronization between UEs 110 and a network entity with which the UEs 110 are to synchronize may be recognized as a challenging problem.

Factors contributing to error in the Radio Frequency (RF) based positioning systems (passive and active) include: resolution; synchronization; association; non-line-of-sight (NLoS) signals; and signal-to-noise ratio (SNR).

Clock synchronization, between the UE 110 and the BS 170, and limited capabilities for each UE 110 are notable issues that hinder the achievement of centimeter-level positioning using positioning subsystems within current cellular systems. Resolving these two issues may be seen as steps toward achieving sub-meter location estimation accuracy. Notably, sub-meter location estimation accuracy is expected to be a feature of the next generation of cellular systems. Next generation cellular systems may be referenced as "6G."

The issue of clock synchronization may be resolved through the use of radar systems for determining positioning of UEs 110. Position determination using radar systems may be shown not to suffer from imperfect synchronization for two main reasons: (1) radar systems utilize clocks that are highly stable to adversarial systematic and environmental effects; (2) the transmission, reception and processing often happen at the same anchor node and with reference to a single timer and oscillator.

The issue of limited capability for each UE 110 may be resolved in a manner that is entirely different from the manner in which the issue of synchronization may be resolved. With the emergence of many use cases, subscribers of a particular cellular network may be expected to have diverse processing capabilities and resources. The processing capabilities may, for example, relate to a sampling rate and a Peak-to-Average Power Ratio (PAPR). The resources may, for example, relate to transmit power.

In a reference-signal-based positioning system (also referred to as an active positioning system), a BS 170 transmits some baseband symbols in a downlink (DL) RF reference signal. A UE 110 receives the DL reference signal, processes the DL reference signal to extract the baseband symbols and responds to the DL reference signal with an upload (UL) RF reference signal that may be, in part, based on processing the extracted baseband symbols.

The accuracy of a given reference-signal-based positioning system may be seen to rely upon capabilities of a weakest node that processes the DL reference signal. A given UE 110 in a cellular system is, generally, not as capable as a BS 170 in the same cellular system. Accordingly, a minimum positioning accuracy is difficult to guarantee for all UEs 110 of diverse use cases across the cellular system.

It is proposed herein to leverage a (passive) sensor positioning system to circumvent various issues present in active positioning systems. Such issues include synchronization issues and limited hardware capability issues.

It is an innate characteristic of terrestrial cellular communications networks that multipath signals and multi-agent environments cause difficulty in attempts, by a BS 170, to determine a position for a given UE 110 based on the echoes of an RF (e.g., radar) signal that has originated at the BS 170.

In particular, multipath propagation in cellular networks causes multiple radar echoes to be received, at the BS 170, from targets of different sizes and myriad electrical properties. For a receiver, at the BS 170, to be able to estimate a range and an angle to a particular UE 110, it is the task for the receiver to isolate radar echoes of the particular UE 110 from among all received radar echoes, including the radar echoes from other objects in the environment. It may be shown that the amount of power echoing from an object (the particular UE 110 or other objects) depends on the size, shape and dielectric properties of the object. Unfortunately, the other objects (buildings, ground, foliage, etc., that are not of interest to the receiver) may be shown to cause radar echoes that are many orders of magnitude larger than the radar echoes caused by the UEs 110. The radar echoes of interest may be shown to be masked by the larger radar echoes. The UEs 110 have a smaller RCS than the RCS of other objects. To summarize, proper disentanglement of the radar echoes received from static objects from those radar echoes received from the UEs 110 is an important problem to tackle.

Determining a position for a particular UE 110 using a sensing-based system is hindered in view of the existence of multiple agents in the environment. In practice, a given cellular communications network is packed with many UEs 110. A position is to be determined for each of the UEs 110.

Using a sensing-based system (such as a radar system) external to a cellular communication system may be seen to allow for a determination of a position for a particular UE 110.

Unfortunately, sensing-based system observations, such as radar echoes, provide little information that can be usefully exploited to infer an identity of a particular UE 110 associated with a particular radar echo. That is, given multiple radar echoes received from multiple UEs 110, it is expected that there will be ambiguity regarding which radar echo to associate with which UE 110 and vice versa.

When there is an incorrect association of observations to a particular UE 110, effects on the accuracy of position estimation for the particular UE 110 can be expected. Indeed, some of the effects on the accuracy may be characterized as catastrophic. Inaccurate position estimation may be shown to result in erratic jumping (ranging from tens of meters to hundreds of meters) of the estimated position of the particular UE 110 at consecutive times. Such position jumping cannot be physically justified given the limited kinematics of UEs 110 in general.

Conventional methods involving a BS 170 and a UE 110 exchanging DL and UL reference signals in a cellular communication system to allow for a determination of a position for the UE 110 are well-known. Similarly, methods of using a sensing-based system (such as a radar system) separate from a cellular communication system to allow for a determination of a position for a UE 110 are also well-known. Furthermore, methods that combine reference signal exchanging methods and hardware-based sensing-based system methods have been gaining research attention.

It may be shown that implementing methods that combine reference signal exchanging methods and hardware-based sensing-based system methods is not straightforward. Indeed, reference signal exchanging methods and hardware-based sensing-based system methods may be seen to rely upon fundamentally distinct technologies.

In overview, according to aspects of the present application, a location management function receives, from a sensor system, a sensing-based profile from which a sensing-based observation of a UE may be determined and receives, from a communication system, a reference-signal-based observation of the UE. The location management function may derive, from the sensing-based observation, a particular position hypothesis and may determine, from the reference-signal-based observation, UE identity information for the UE. By processing the reference-signal-based observation in conjunction with the sensing-based observation, the location management function may determine an association between the sensing-based observation and the reference-signal-based observation. The location management function may then transmit, to the UE having the UE identity information determined from the reference-signal-based observation, an indication of the particular position hypothesis that is associated to that UE, where the particular position hypothesis has been derived from the sensing-based observation.

According to aspects of the present application, a sensor system radiates a pulse of energy and receives echoes of the pulse from one or more UEs 110. Due to the shared nature of the wireless medium over which the pulse travels, it is clear that a single pulse can result in radar echoes returned from more than one of the UEs 110. The sensor system records each of the radar echoes to allow for processing. The processing of the information in these recorded radar echoes leads to a condensing of the information down to a limited set of features. The features may, for example, include: round-trip delay; angle of arrival; Doppler shift; and received power. These features may be referenced as "observations" hereinafter.

Figure 5:
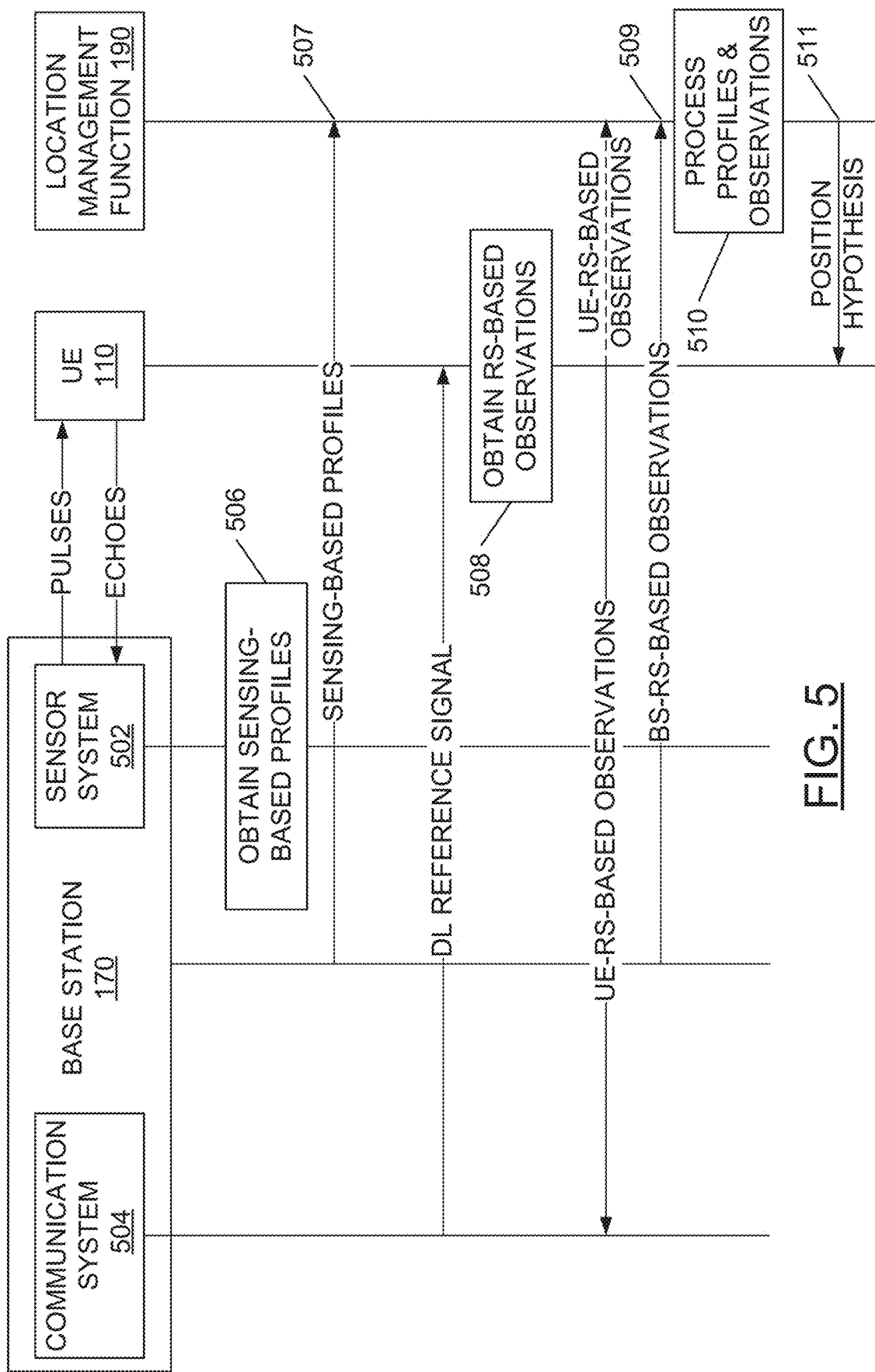
FIG. 5 illustrates, in a flow diagram, interaction between elements of the network of FIG. 1, including an example base station, an example user equipment and an example location management function, in accordance with aspects of the present application.

FIG. 5 illustrates, in a flow diagram, interaction between a base station 170, a UE 110 and the location management function 190. The base station 170 includes a sensor system 502 and a communication system 504.

In general terms, location determination begins with a sensing episode, continues with a reference signal exchanging episode, proceeds with a processing episode and concludes with a location indication episode. Notably, the sensing episode and the reference signal exchanging episode may occur in any order and may even occur contemporaneously.

Initially, the sensor system 502 transmits a sensing signal, which may, for example, be a radar pulse. During the sensing episode, the sensor system 502 receives echoes, of the sensing signal, from the UE 110 and from other objects in the environment of the communication system 100.

The sensor system 502 may then obtain (step 506) sensing-based profiles. The sensing-based profiles may be representative of geometric range measurements and/or angle measurements. Recall that radar-based sensor systems often use a transceiver (not specifically shown) that continuously rotates 360 degrees about a central axis. Notably, radar-based sensor systems do not necessarily rotate mechanically to steer the direction of a beam. In other radar-based sensor systems, the beam may be rotated electronically while the hardware remains static. The geometric range measurements may be understood to relate to a distance between the transceiver and the origin of the echoes. The angle measurements may be understood to relate to a span of angles offset from a reference angle on the circle around the central axis, where the origin of the echoes may be characterized by the span of angles in which the echoes are received. Upon completion of the obtaining (step 506) of the sensing-based profiles, the BS 170 transmits the sensing-based profiles to the location management function 190. The location management function 190 obtains (step 507) the sensing-based profiles. In the context of the LMF 190 obtaining (step 507) the sensing-based profiles, the BS 170 may be generically called a profile origin.

During normal operation, the communication system 504 transmits downlink (DL) reference signals that may be received and processed by various entities in the communication system 100, including the UE 110. The DL reference signals are typically high-power and wideband signals.

Upon receipt of the DL reference signals, the UE 110 may obtain (step 508) UE reference-signal-based (UE-RS-based) observations. The UE 110 may then transmit an uplink (UL) reference signal to the base station 170. The UL reference signal may include the UE-RS-based observations and an indication of the identity of the UE 110. Alternatively, or additionally, the UE 110 may transmit the UE-RS-based observations to the location management function 190 along with the indication of the identity of the UE 110. The location management function 190 obtains (step 509) the BS-RS-based observations.

The communication system 504 receives the UE-RS-based observations from the UE 110. Conveniently, as discussed hereinbefore, the UE-RS-based observations include UE identity information for the UE 110 at which the UE-RS-based observations have been obtained. Responsive to receiving the UE-RS-based observations, the base station 170 may obtain BS-RS-based observations. The base station 170 may then transmit the BS-RS-based observations to the location management function 190. Conveniently, the BS-RS-based observations include the UE identity received as part of the UE-RS-based observations.

Upon having received both the sensing-based profiles and the RS-based observations, the location management function 190 may process (step 510) the profiles and the observations.

The processing (step 510) of the sensing-based profiles may be accomplished, in one aspect, by way of a Doppler analysis. The Doppler analysis may be used, by the location management function 190, to separate echoes originating at the (mobile) UE 110 from echoes originating at (static) clutter in the environment. The echoes originating at the (mobile) UE 110 may be regarded as foreground signals. The echoes originating at the (static) clutter may be regarded as background signals.

On the basis of combining the geometric range measurements and the angle measurements, sensing-based observations may be determined on the basis of the profiles and the location management function 190 may derive, from the sensing-based observations, a position to associate with the UE 110 that was the origin of the echoes.

The processing (step 510) of the sensing-based profiles and the BS-RS-based observations may involve determining sensing-based observations on the basis of the sensing-based profiles and may, subsequently, lead to matching a particular one of the BS-RS-based observations to a particular one of the sensing-based observations. Notably, since the position has been derived from the sensing-based observations and the UE identity information has been determined from the BS-RS-based observations, the processing (step 510) may, in part, include associating the position, which was derived from the particular sensing-based observation, with the UE identity information, which was determined from the particular BS-RS-based observation.

The location management function 190 may then transmit (step 511), to the UE 110 having the UE identity information determined from the reference-signal-based observation, an indication of the position derived from the sensing-based observation. Notably, indication of the position is not necessarily intended for transmission (step 511) to the UE 110. Instead, the indication of the position can be used for other tasks. The other tasks include predicting future mobility of the UE 110. The other tasks include management of beams transmitted from the BS 170. Beam management is discussed hereinafter.

The sensing-based observations may, for one example, be Round Trip Time, RTT, measurements. In such a case, for matching purposes, it is convenient that the BS-RS-based observations are also RTT measurements.

RTT may be considered to be the time taken by a signal to travel from the BS 170 to the UE 110 and then back to the BS 170. For the sensor system 502, in one example, the outbound signal is a radar pulse and the inbound signal is an echo of the radar pulse. For the communication system 504, the outbound signal is the DL reference signal and the inbound signal is the UL reference signal including the UE-RS-based observations.

Figure 6:
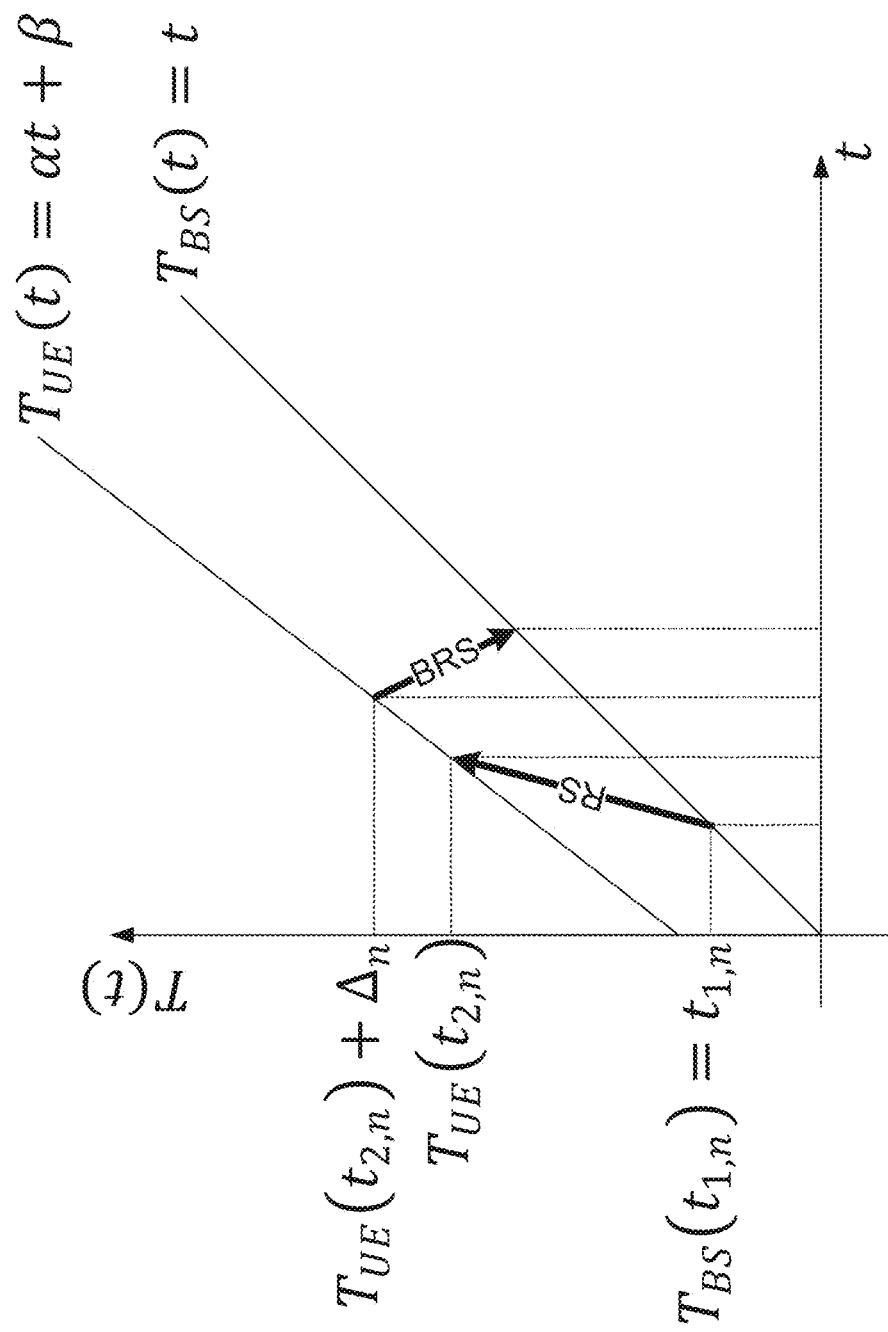
FIG. 6 illustrates a plot used to explain clock bias.

In FIG. 5, there is only one BS 170 in the network. Accordingly, it may be considered that measurements carried out at the BS 170 will be affected by a clock bias. The clock bias may be understood through a review of a plot illustrated in FIG. 6. The plot illustrated in FIG. 6 includes a first line, $T_{BS}(t)$, representative of a base station time frame and a second line, $T_{UE}(t)$, representative of a user equipment time frame. The first line is described by a first function, $T_{BS}(t)=t$. The second line is described by second function, $T_{UE}(t)=\alpha t+\beta$, where $\alpha$ represents UE clock skew and $\beta$ represents the UE clock bias.

A reference signal transmitted, by the BS 170, at a time $t_{1,n}$ arrives at the UE 110 at a time $t_{2,n}=t_{1,n}+\tau$, where x is a one-way propagation delay. The UE 110 receives the DL reference signal, processes the DL reference signal, accesses data to obtain UE-RS-based observations and transmits an UL reference signal, including the UE-RS-based observations, to the base station 170. These four actions each contribute to a UE delay, $\Delta_n$, where $\Delta_n$=reception delay+processing delay+access delay+ transmission delay.

The UL reference signal transmitted, by the UE 110, at a time $t_{3,n}$ arrives at the BS 170 at a time $t_{4,n}=t_{3,n}+\tau$.

The communication system 504 may determine a reference signal round trip time, $RTT_p$. Determining the $RTT_p$ at the communication system 504 involves obtaining a difference between the time the DL reference signal was sent (time $t_{1,n}$) and the time the UL reference signal was received (time $t_{4,n}$). That is, $$RTT_p = t_{4,n} - t_{1,n}$$
$$= t_{3,n} + \tau - (t_{2,n} - \tau)$$
$$= 2\tau + t_{3,n} - t_{2,n}$$
$$= 2\tau + \frac{\Delta_n}{\alpha}.$$

In the case of obtaining (step 506) a sensing-based round trip time, $RTT_s$, it is notable that there are no delays at the UE 110, since the radar pulse is merely reflected, not processed. It follows that an echo departs from the UE 110 as soon as the radar pulse arrives at the UE 110 and $RTT_s=2\tau$. If the sensing-based round trip time, $RTT_s$, is considered in terms of the RS-based round trip time, $RTT_p$, then it may be considered that $\Delta_n=0$ for $RRT_s$ estimation. It may further be considered that the accuracy of the processing (step 510) of the profiles (to determine sensing-based observations) and the observations to find matches between the sensing-based observations ($RTT_s$) and the RS-based observations ($RTT_p$) would be expected to improve as the UE delay, $\Delta_n$, component of the RS-based observations approaches zero.

Depending on hardware speed, access mechanism and how much processing is performed on the received data inside a protocol stack at the UE 110, the UE delay, $\Delta_n$, can be a few orders of magnitude larger than the one-way propagation delay, $\tau$. This leads, problematically, to an expectation that $RTT_p \gg RTT_s$.

However, aspects of the present application relate to the UE 110 determining an estimate, $\Delta_n'$, for the value of the UE delay, $\Delta_n$, and reporting the estimate, $\Delta_n'$, to the location management function 190. Subsequent to receiving the estimate, $\Delta_n'$, the processing (step 510) of the profiles and the observations at the location management function 190 may involve applying a correction to the BS-RS-based observations, $RTT_p$. The location management function 190 may determine a corrected version, $RTT_p'$, of the BS-RS-based observations $RTT_p$ by subtracting the estimate, $\Delta_n'$, therefrom, i.e., $RTT_p'=RTT_p-\Delta_n'$. The location management function 190 may then attempt to find matches between the corrected RS-based observations, $RTT_p'$, and the sensing-based observations $RTT_s$.

Moreover, if the BS 170 has an estimate, $\alpha'$, of the UE clock skew, $\alpha$, a more accurate correction to the RS-based observations may be determined from $RTT_p''=$ $$RTT_p - \frac{\Delta_n'}{\alpha'}.$$

In aspects of the present application, the estimate, $\alpha'$, of the UE clock skew, $\alpha$, may be determined by the UE 110. In other aspects of the present application, the estimate, $\alpha'$, of the UE clock skew, $\alpha$, may be determined through a network-wide synchronization process.

As described hereinbefore, the LMF 190 receives the sensing-based profiles and the BS-RS-based observations, $RTT_p$. The processing (step 510) of the sensing-based profiles and the BS-RS-based observations may involve determining sensing-based observations, $RTT_s$, on the basis of the sensing-based profiles and may, subsequently, lead to matching a particular one of the BS-RS-based observations, $RTT_p$, to a particular one of the sensing-based observations, $RTT_s$.

According to aspects of the present application, in situations wherein the BS 170 and the UE 110 are suitably synchronized, one-way RS-based observations may be received and processed by the LMF 190. That is, the LMF 190 may receive observations based on only a DL reference signal (from BS 170 to UE 110) and/or only a UL reference signal (from UE 110 to BS 170). When processing (step 510) observations in such a case, the LMF 190 may be expected to match the one-way RS-based observations to a value representative of half of the sensing-based observations, $RTT_s$.

In the preceding, a position hypothesis for the UE 110 was derived using sensing at only one BS 170. This may be called "mono-static sensing." In aspects of the present application, a position hypothesis for the UE 110 may be derived using two BSs 170. This may be called "bi-static sensing."

In scenarios wherein communications subsystems and sensing subsystems use a unified, wide-pulse, wideband waveform, such as is used in an OFDM context, and wherein the base stations do not have full-duplex radios, the mono-static configuration may run into a problem. The problem may relate to a power gap between the transmitted pulse and the received echoes. Often the power in the transmitted pulse is so strong and the power in the received echoes is so weak that, no matter how isolated the transmit/receive chains are, even a small leakage/induction from the transmit side to the receive side results in a complete swamping of the received echoes. To solve this issue, the bi-static sensing configuration can be used. In the bi-static sensing configuration, the transmission point ("TP," e.g., the BS 170) that transmits the sensing signal (the pulse) is different from the TP at which the echo is received. This way, the radio of the receive side is not swamped by the high power signals of the transmit side, as there is large distance between the transmit side and the receive side.

The range data that is obtained based on profiles obtained at the TP at which the echo is received may not be called RTT, because the pulse has not made a "return" trip. Instead, the range data obtained based on profiles obtained at the TP at which the echo is received may be called bi-centric range (BCR) data. When BCR data is generated in during the sensing episode, it follows that an equivalent quantity should be generated during the reference signal exchanging episode. Equivalent quantities facilitate matching in the observation processing step. Collection of BCR data is illustrated in a flow diagram in FIG. 7. A first BS 170A transmits a downlink reference signal (DL-RS). Responsive to receiving the DL-RS, a UE 110 transmits an uplink reference signal (UL-RS) to a second BS 170B. In a manner familiar from the first embodiment above, it is preferable to minimize an intra-UE delay.

In one aspect of the present application, intra-UE delay is minimized by an immediate piggybacking of the UL-RS to the DL-RS. In another aspect of the present application, the effect of intra-UE delay on accuracy of BCR data may be minimized by the UE 110 accurately gauging and reporting intra-UE delay to the location management function 190, so that BS-RS-based observations may be calibrated.

Figure 7:
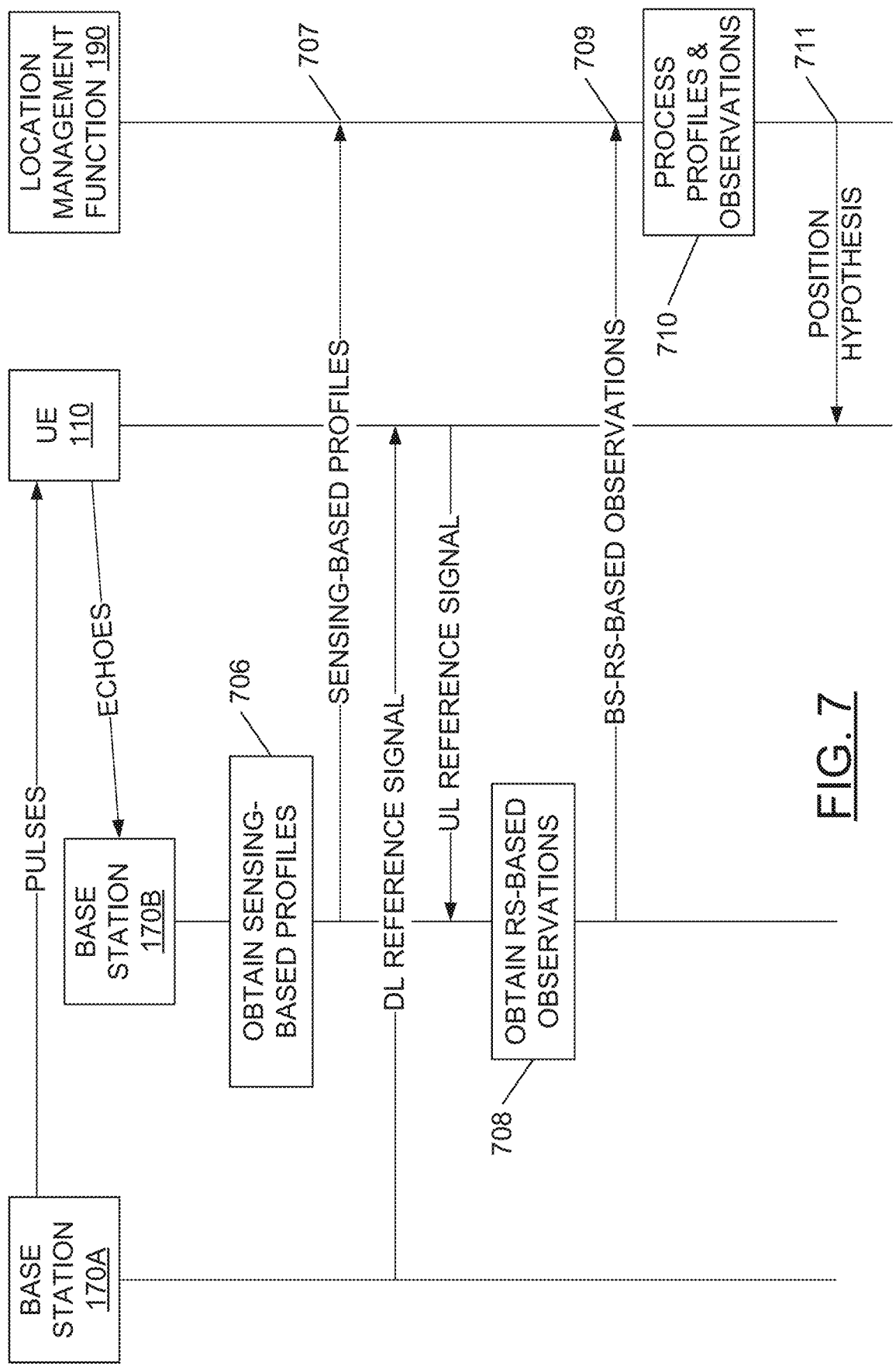
FIG. 7 illustrates, in a flow diagram, interaction between elements of the network of FIG. 1, including two base stations, a user equipment and the location management function, in accordance with aspects of the present application.

In the flow diagram of FIG. 7, interaction is illustrated between the first base station 170A, the second base station 170B, the UE 110 and the location management function 190. Although not specifically illustrated, the first base station 170A and the second base station 170B may be understood to include a sensor system similar to the sensor system 502 in FIG. 5. Although not specifically illustrated, the first base station 170A and the second base station 170B may be understood to include a communication system similar to the communication system 504 in FIG. 5.

Initially, the first base station 170A transmits a sensing signal, which may, for example, be a radar pulse. During the sensing episode, the sensor system of the second base station 170B receives echoes, of the sensing signal, from the UE 110 and from other objects in the environment of the communication system 100.

The sensor system may then obtain (step 706) sensing-based profiles. Upon completion of the obtaining (step 706) of the sensing-based profiles, the second base station 170B transmits the sensing-based profiles to the location management function 190. The location management function 190 obtains (step 707) the sensing-based profiles. In the context of the LMF 190 obtaining (step 707) the sensing-based profiles, the BS 170 may be generically called a profile origin.

The first BS 170A transmits a downlink (DL) reference signal that may be received by the UE 110. The DL reference signal may be a high-power wideband signal. The UE 110 is, according to aspects of the present application, configured to receive the DL reference signal and generate an upload (UL) reference signal (RS). The UE 110 then transmits the UL-RS to the second BS 170B.

The communication system of the second BS 170B receives the UL reference signal (RS) from the UE 110. Conveniently, as discussed hereinbefore, the UL-RS includes identity information for the UE 110 at which the UL-RS has been generated. Responsive to receiving the UL-RS, the communication system obtains (step 708) BS-RS-based observations. On the basis of a particular BS-RS-based observation, the communication system may determine the identity information for the UE 110 and associate the identity information with the particular BS-RS-based observation.

At least some of the BS-RS-based observations obtained, by the communication system in step 708, are of the same type and from the same UE 110 (in the context of multiple UEs 110) as at least some of the sensing-based observations that may be determined on the basis of the sensing-based profiles obtained, by the sensing system, in step 706. Upon completion of the obtaining (step 708) of the BS-RS-based observations, the second BS 170B transmits the BS-RS-based observations to the location management function 190. The location management function 190 obtains (step 709) the BS-RS-based observations.

The location management function 190 processes (step 710) the sensing-based profiles, obtained in step 707, to determine sensing-based observations and derive a position for the UE 110. The processing (step 710) of the sensing-based profiles may be accomplished, in one aspect, by way of a Doppler analysis. The location management function 190 may use Doppler analysis to separate echoes from the (mobile) UE 110, which echoes may be regarded as foreground signals, from echoes from (static) clutter in the environment, which echoes may be regarded as background signals.

The location management function 190 also processes (step 710) the BS-RS-based observations, obtained in step 709, to determine, from the BS-RS-based observations, UE identity information for the UE 110.

On the basis of the same observations, the processing (step 710), by the location management function 190, may involve obtaining sensing-based observations from the sensing-based profiles and may, subsequently, lead to a matching of certain of the BS-RS-based observations to certain of the sensing-based observations. Notably, since the sensing-based observations are associated with a position hypothesis and the RS-based observations are associated with UE identity information, the matching (step 710) may be used to associate the position with the UE identity information.

The location management function 190 may then transmit (step 711), to the UE 110 associated with the UE identity information, an indication of the position. Notably, indication of the position is not necessarily intended for transmission (step 711) to the UE 110. Instead, the indication of the position can be used for other tasks. The other tasks include predicting future mobility of the UE 110. The other tasks include management of beams transmitted from the BS 170. Beam management is discussed hereinafter.

Accordingly, it can be seen that the bi-static sensing configuration can be used so that the radio of the receive side is not swamped by the high power signals of the transmit side.

The approach outlined in FIG. 7 may not be effective to localize all UEs 110 with diverse use cases.

For example, the processing (step 710) of the sensing-based profiles have been described hereinbefore as being carried out, in one aspect, by way of a Doppler analysis. The Doppler analysis acts to separate echoes from the (mobile) UE 110 from echoes from (static) clutter in the environment. Notably, a given UE 110 may be immobile (e.g., an Internet-of-things device) or have a variable speed (e.g., in a vehicle, the UE 110 may occasionally be stopped).

There are scenarios where UEs 110 have insignificant RCS, such that the UE 110 cannot be detected, even after Doppler analysis. One example of this scenario is a pedestrian waking down a street.

There are scenarios where UEs 110 are not capable of receiving DL reference signals or transmitting UL reference signals. A given UE 110 may not be able transmit/receive with a signal-to-noise ratio (SNR) that is sufficient to allow for generation of accurate geometric measurements or a bandwidth that is sufficient to allow for generation of accurate geometric measurements.

Up to the point of the discussion of the approach illustrated in FIG. 7, the propagation phenomenon called "multipath," that is, signal interaction with clutter through reflection/refraction, is the only propagation phenomenon that has been considered. Notably, there is another type of propagation phenomenon, namely "shadowing." Shadowing happens when a direct path (a line-of-sight in the three-dimensional Euclidean space) connecting a UE 110 to a BS 170 is blocked by an object that either attenuates (through absorption) all the energy of the propagating signal in this line-of-sight or attenuates the propagating signal well enough that the received SNR of the directly propagating signal is below the detection threshold of hardware at the UE 110.

Without regard to the manner in which the shadowing occurs, the shadowing leads to a phenomenon known as non-Line-of-Sight (NLoS), which means that the strongest signal is received from an indirect path, without the receiver knowing that the path has been indirect. Therefore, any estimation of range/angle has a bias caused by the extra distance, compared to the direct path, the signal has travelled to reach the receiver. Since this shadowing bias is additive (in a manner similar to clock bias), shadowing bias will disrupt the association of position information with UE identity information based on a match between sensing-based observations and RS-based observations. The disruption can be mitigated when both the sensing signal (pulse) and the DL reference signal are transmitted in the same frequency range with the same power. The latter is often not the case as it is the large power, wide bandwidth, and high frequency of the sensing signal that is its defining characteristic.

Figure 8:
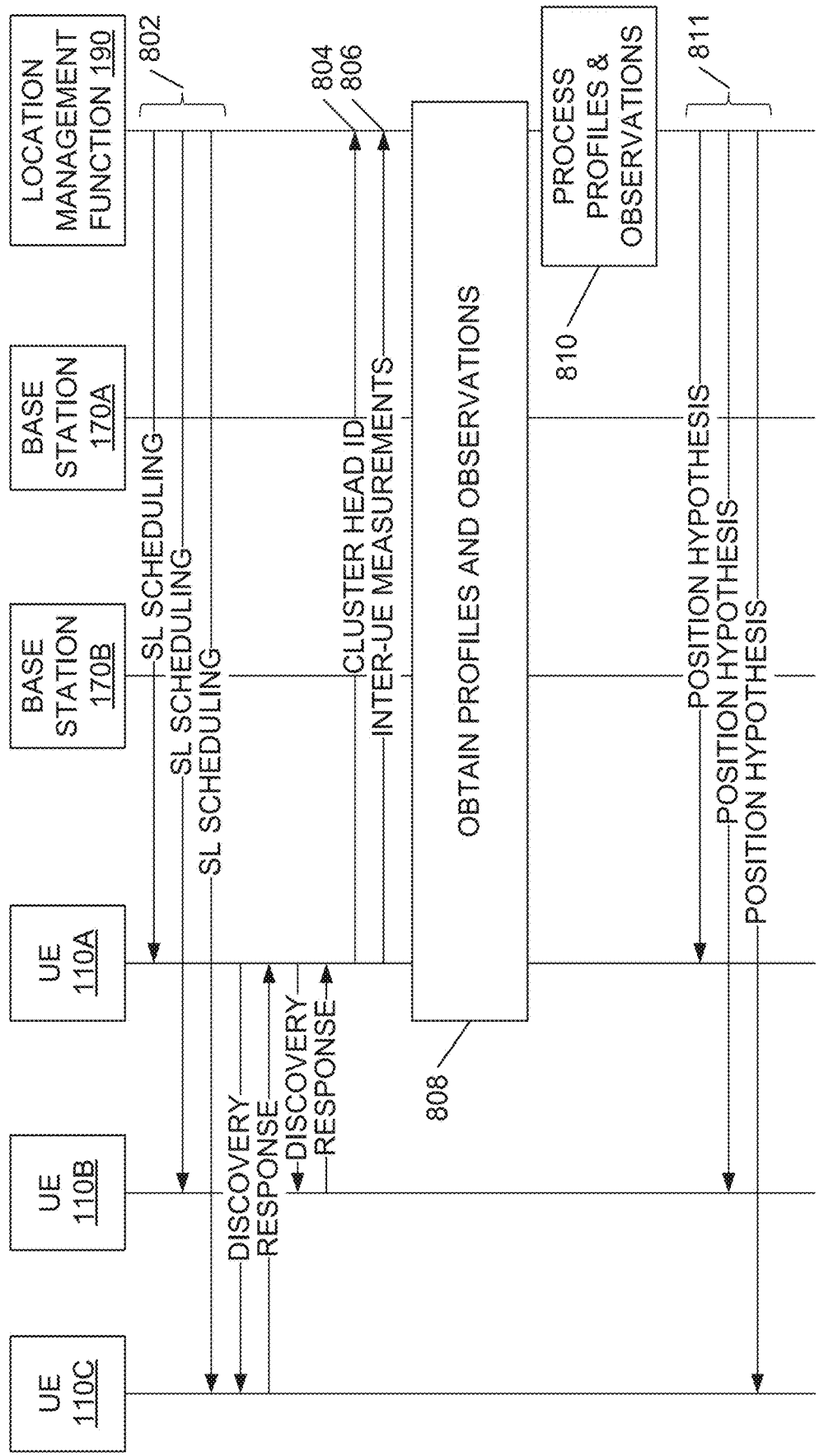
FIG. 8 illustrates, in a flow diagram, interaction between elements of the network of FIG. 1, including two base stations, three user equipments and the location management function, in accordance with aspects of the present application.

A solution that partly addresses these problems involves the UEs 110 communicating between themselves using Sidelink (SL) communications. FIG. 8 illustrates, in a flow diagram, interaction between the first base station 170A, the second base station 170B, the first UE 110A, the second UE 110B, the third UE 110 and the location management function 190. The location management function 190 may create a cluster of UEs 110 and select one or more candidate UEs 110 as a cluster head (CH). The UE 110 selected to be the CH (when there is only one) preferably has characteristics well-suited to a CH. That is, the UE 110 selected to be the CH should: be mobile; have no power limitation; have no bandwidth limitation; and have a LoS link to the BS 170.

In FIG. 8, consider that the first UE 110A has been selected as the CH.

Initially, the location management function 190 transmits (step 802), to the UEs 110, an indication of an SL communication schedule in addition to an indication of the selection of the first UE 110A as the CH.

In accordance with the SL communication schedule, the first UE 110A exchanges SL communication with the second UE 110B and the third UE 110C. Through this exchange, the first UE 110A, in its role as CH, obtains inter-UE measurements. The first UE 110A may use, for but two examples, ranging and proximity discovery to obtain the inter-UE measurement to associate with each of the UEs 110 in the cluster.

The first UE 110A then transmits, to the location management function 190, an indication of its cluster head identifier (ID) and the inter-UE measurements that have been obtained on the basis of SL communications with the other UEs 110. The location management function 190 receives (step 804) the cluster head ID and receives (step 806) the inter-UE measurements. The location management function 190 then proceeds to obtain (step 808) profiles and observations of the first UE 110A, the obtaining (step 808) may be carried out, for example, in the manner of the flow diagram of FIG. 5 or the manner of the flow diagram of FIG. 7.

By processing (step 810) the profiles and observations obtained in step 808, the location management function 190 may obtain a position for the first UE 110A. By processing the inter-UE measurements in combination with the position for the first UE 110A, the location management function 190 may determine respective positions for the other UEs 110 in the cluster. Upon determining the positions, the location management function 190 transmits (step 811) the positions to the UEs 110. Notably, indication of the position is not necessarily intended for transmission (step 811) to the UE 110. Instead, the indication of the position can be used for other tasks. The other tasks include predicting future mobility of the UE 110. The other tasks include management of beams transmitted from the BS 170. Beam management is discussed hereinafter.

Unfortunately, when there are multiple UEs 110 in the environment, there remains ambiguity regarding the matching (in step 510, 710 or 810) of certain of the RS-based observations to certain of the sensing-based observations.

It has been stated hereinbefore that the sensing episode includes the sensor system 502 transmitting a sensing signal. Indeed, the sensor system 502 may transmit a plurality of consecutive sensing signals.

It has also been discussed that the Doppler analysis portion of the processing (in step 510, 710 or 810) of the sensing-based profiles may be used to separate foreground signals from background signals. The foreground signals are presumed to be due to echoes of the UE 110. The background signals are presumed to be due to echoes of the other objects, including static clutter. Unfortunately, the echoes of the other objects may be disproportionately large relative to the echoes of the UE 110.

The Doppler analysis portion of the processing (in step 510, 710 or 810) of the sensing-based profiles may be a full-fledged Doppler analysis that includes estimation of the non-zero velocity of the UE 110. In this case, as part of a clutter elimination process, each object of clutter may be treated as a static object having velocity of zero. It can be shown that longer duration sensing episodes result in better disentanglement of foreground signals from background signals. One outcome of the Doppler analysis portion of the processing (in step 510, 710 or 810) of sensing-based profiles may be seen to be a processed power-delay-profile (processed PDP), in the case of range-radar, and a processed power-angular-profile (processed PAP), in the case of direction-radar.

Figure 9B:
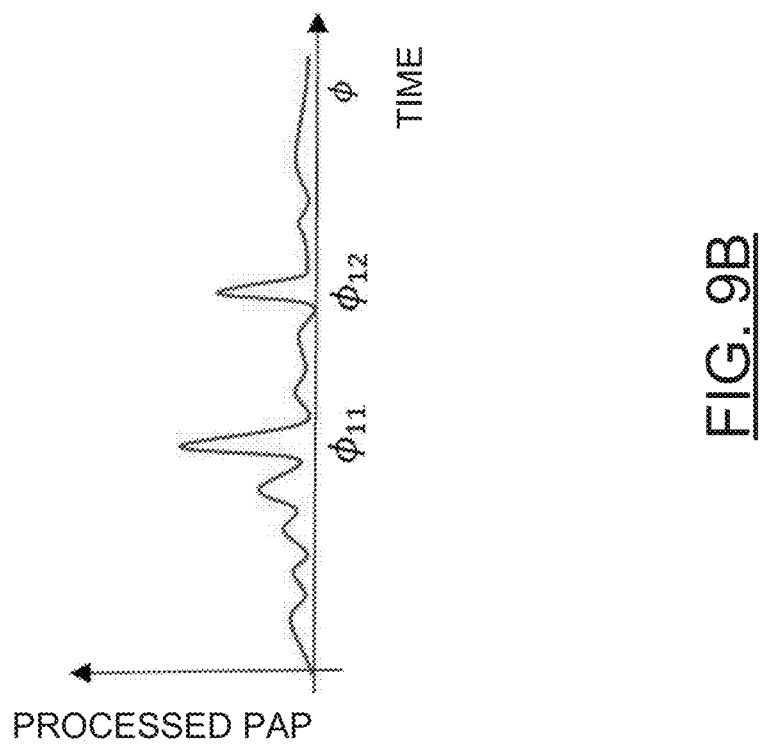
FIG. 9B illustrates an example processed power-angular-profile.
Figure 9A:
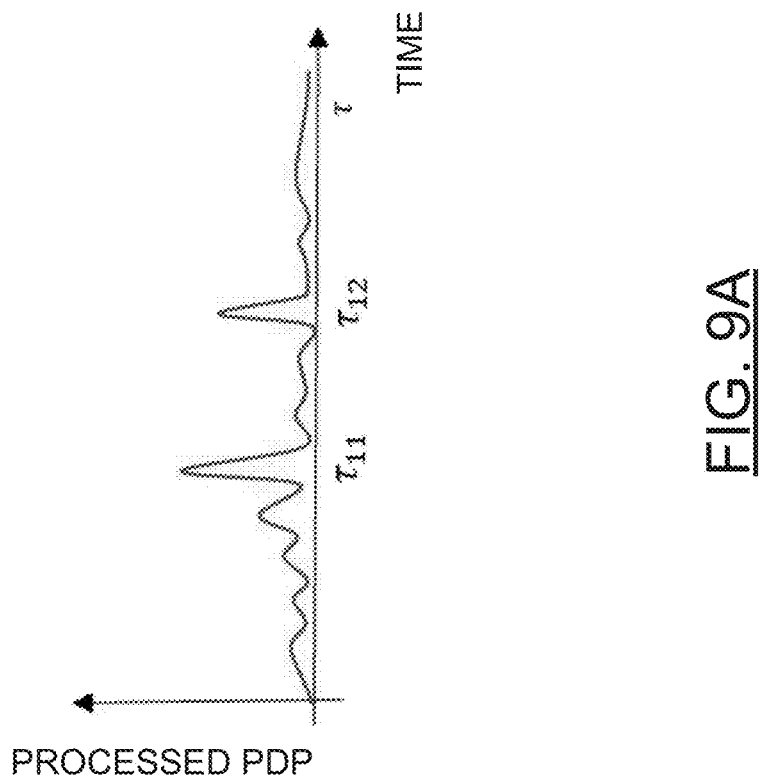
FIG. 9A illustrates an example processed power-delay-profile.

An example processed PDP is illustrated in FIG. 9A. An example processed PAP is illustrated in FIG. 9B.

Upon completion of the clutter elimination process, the location management function 190 may be configured to estimate (i) a round-trip time (RTT), on the basis of the processed PDP and/or (ii) an angle-of-arrival (AoA) measurement, on the basis of the processed PAP and/or (iii) velocities, on the basis of all the peaks found in the profiles (PDP and/or PAP).

At any given time in the communication system 100, more than one BS 170 may be transmitting sensing signals and reference signals. Accordingly, the location management function (LMF) 190 may receive RS-based observations and may receive sensing-based profiles from each of the more than one BS 170.

In the case of range radar, responsive to the receiving sensing-based profiles, the LMF 190 may determine, for each BS 170, a plurality of round-trip-time (RTT) measurements. A processed PDP associated with a particular BS 170 may be considered to have a time axis and a PDP function axis (see FIG. 9A). The plurality of RTT measurements may be determined as a time axis value for each of the peaks of the processed PDP. That is, if there are three peaks in the processed PDP, the LMF 190 will recognize three RTT measurements.

The LMF 190 may appoint one BS 170, among a plurality of BSs 170, as a temporal reference. The LMF 190 may then obtain a plurality of RTT-difference-of-arrival (RTTDoA) scalar values for each BS 170 on the basis of subtracting the RTT measurements of the temporal reference BS 170 from the RTT measurement of every BS 170. It should be clear that there is no value to obtaining RTTDoA scalar values, in this way, for the temporal reference BS 170.

In the case of direction radar, responsive to the receiving sensing-based profiles, the LMF 190 may determine, for each BS 170, a plurality of angle-of-arrival (AoA) measurements. A processed PAP associated with a particular BS 170 may be considered to have an angle axis and a PAP function axis (see FIG. 9B). The plurality of AoA measurements may be determined as an angle axis value for each of the peaks of the processed PAP. That is, if there are three peaks in the processed PAP, the LMF 190 will recognize three AoA measurements.

The LMF 190 may appoint one BS 170, among a plurality of BSs 170, as a spatial reference. The LMF 190 may then obtain a plurality of angle-difference-of-arrival (ADoA) scalar values for each BS 170 (except the spatial reference BS 170) on the basis of subtracting the AoA measurements of the spatial reference BS 170 from the AoA measurement of every BS 170 (except the spatial reference BS 170). It should be clear that there is no value to obtaining ADoA scalar values, in this way, for the spatial reference BS 170.

Note that the temporal reference BS 170 and the spatial reference BS 170 may, in some instances, be the same BS 170.

A plurality of difference vectors may be generated, at the LMF 190, by collecting the scalar values for each non-reference BS 170.

A plurality of sensing-based position hypothesis vectors may be determined by forming combinations of one scalar value from each difference vector.

The RTTDoA or ADoA obtained for those BSs 170 that are distinct from the temporal reference BS 170 and the spatial reference BS 170 may be paired with each other to form a plurality of position hypothesis vectors.

Figure 10:
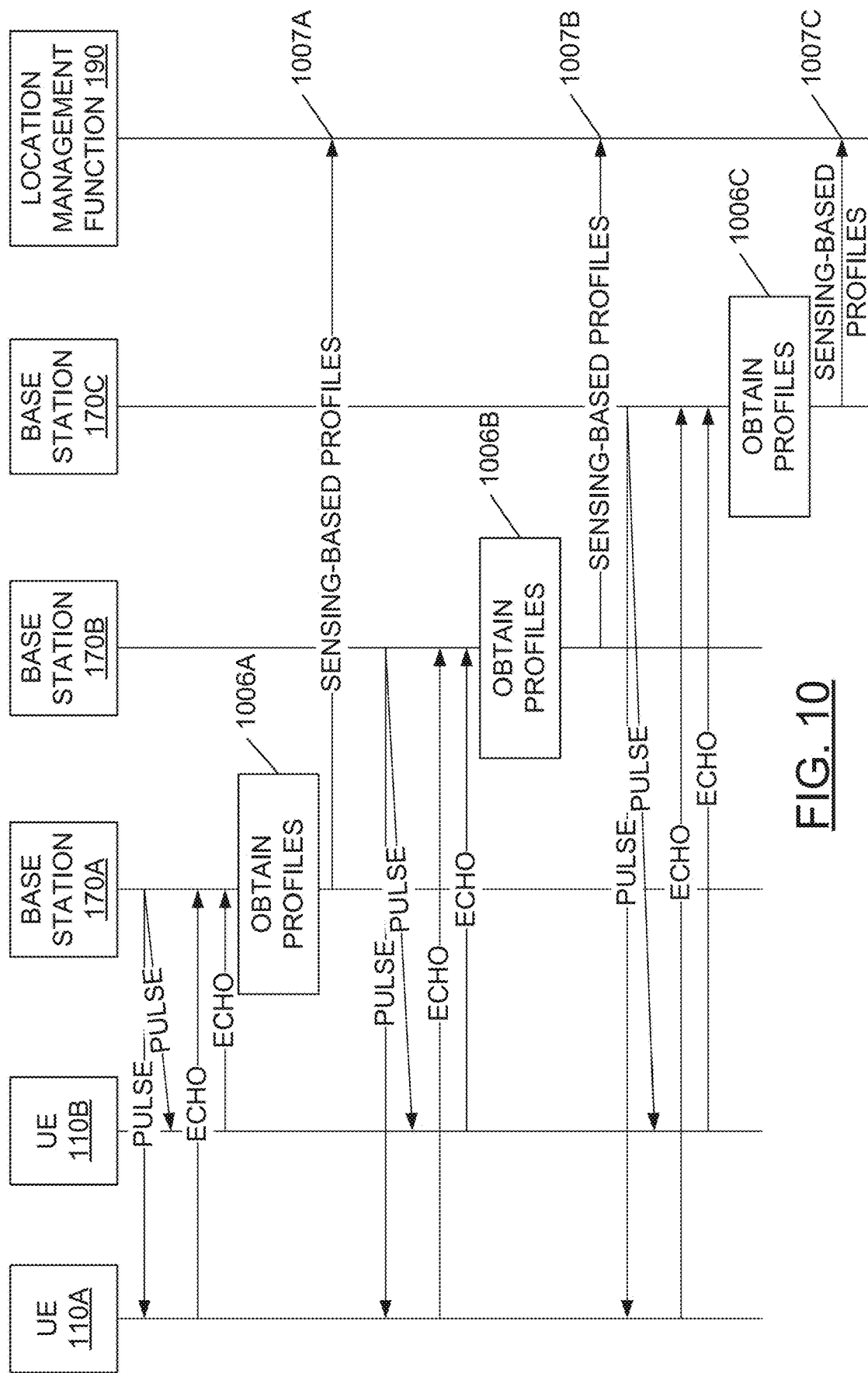
FIG. 10 illustrates, in a flow diagram, sensing episode interaction between elements of the network of FIG. 1, including three base stations, two user equipments and the location management function, in accordance with aspects of the present application.

In a flow diagram in FIG. 10, sensing episode interaction is illustrated between the first base station 170A, the second base station 170B, a third base station 170C, the first UE 110A, the second UE 110B and the location management function 190. Although not specifically illustrated, the first base station 170A, the second base station 170B and the third base station 170C may be understood to include a sensor system similar to the sensor system 502 in FIG. 5. Although not specifically illustrated, the first base station 170A, the second base station 170B and the third base station 170C may be understood to include a communication system similar to the communication system 504 in FIG. 5.

The sensor system of each BS 170 transmits a sensing signal, which may, for example, be a radar pulse. During the sensing episode, each BS 170 receives echoes, of the sensing signal, from the UEs 110 and from other objects in the environment of the communication system 100.

The sensor system of the first BS 170A may, upon receipt of echoes, obtain (step 1006A) sensing-based profiles. The sensor system of the first BS 170B may, upon receipt of echoes, obtain (step 1006B) sensing-based profiles. The sensor system of the first BS 170C may, upon receipt of echoes, obtain (step 1006C) sensing-based profiles.

The sensing-based profiles may include geometric range measurements and angle measurements. Upon completion of the obtaining (steps 1006A, 1006B and 1006C) of each of the sensing-based profiles, each BS 170 transmits the sensing-based profiles to the location management function 190. The location management function 190 obtains (steps 1007A, 1007B and 1007C) the sensing-based profiles. In the context of the LMF 190 obtaining (step 1007) the sensing-based profiles, the BS 170 may be generically called a profile origin.

Figure 11:
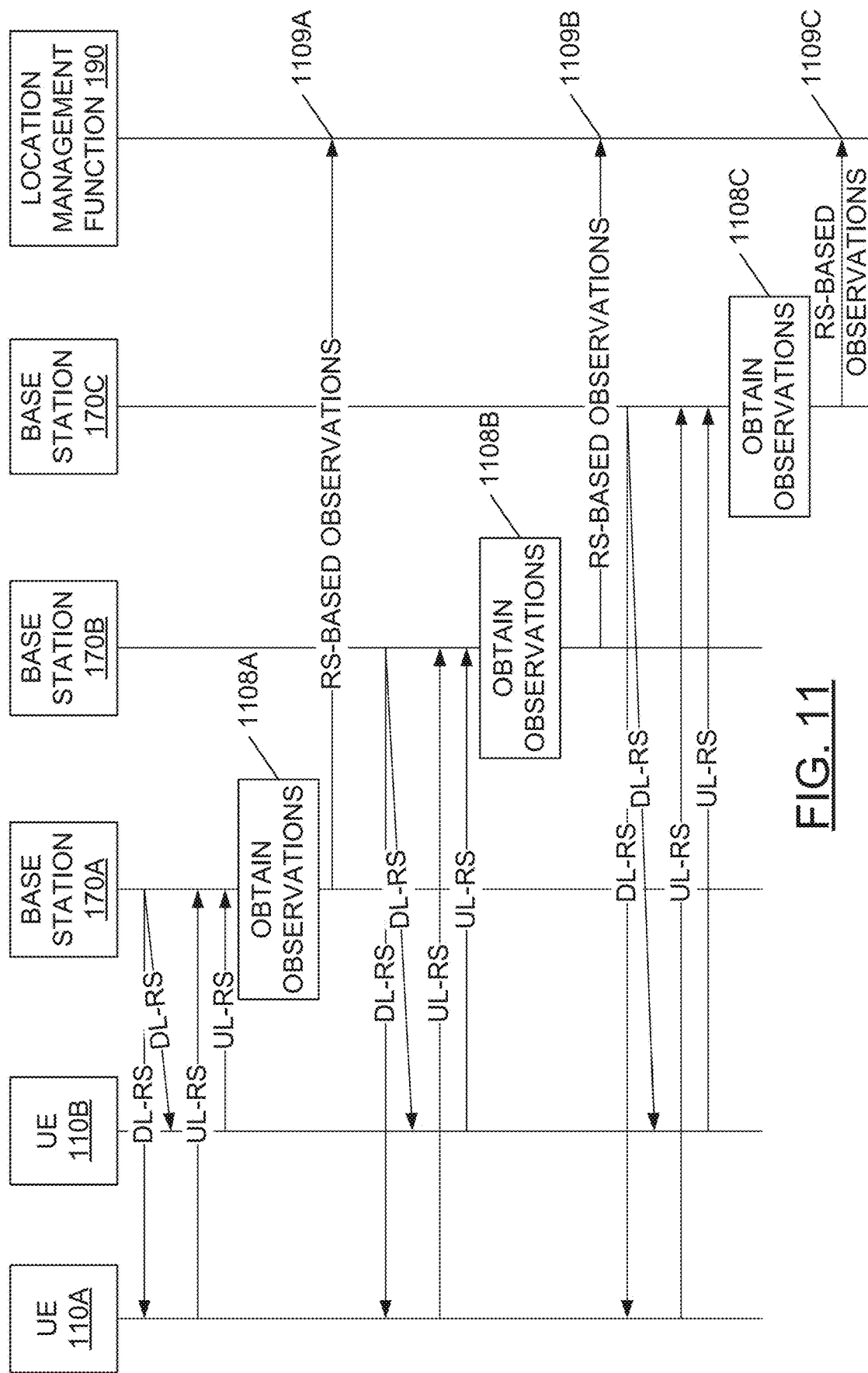
FIG. 11 illustrates, in a flow diagram, reference signal exchanging episode interaction between elements of the network of FIG. 1, including three base stations, two user equipments and the location management function, in accordance with aspects of the present application.

In a flow diagram in FIG. 11, reference signal exchanging episode interaction is illustrated between the first base station 170A, the second base station 170B, the third base station 170C, the first UE 110A, the second UE 110B and the location management function 190. Although not specifically illustrated, the first base station 170A, the second base station 170B and the third base station 170C may be understood to include a sensor system similar to the sensor system 502 in FIG. 5. Although not specifically illustrated, the first base station 170A, the second base station 170B and the third base station 170C may be understood to include a communication system similar to the communication system 504 in FIG. 5.

The flow diagram of FIG. 11 may be considered to be a continuation of the flow diagram of FIG. 10.

The first BS 170A transmits a downlink (DL) reference signal (RS) that may be received by the first UE 110A and the second UE 110B. The DL reference signal may be a high-power wideband signal. Each UE 110 is, according to aspects of the present application, configured to receive the DL-RS and generate an upload (UL) RS. Each UE 110 then transmits the UL-RS to the first BS 170A.

The communication system of the first BS 170A receives the UL-RS from each UE 110. Conveniently, as discussed hereinbefore, the UL-RS includes identity information for the UE 110 at which the UL-RS has been generated. Responsive to receiving the UL-RS, the communication system of the first BS 170A obtains (step 1108A) BS-RS-based observations. On the basis of a particular BS-RS-based observation, the communication system may determine the identity information for the UE 110 and associate the identity information with the particular BS-RS-based observation.

At least some of the BS-RS-based observations obtained, by the communication system of the first BS 170A in step 1108A, are from the same UE 110 as at least some of the sensing-based profiles obtained, by the sensing system of the first BS 170A, in step 1006A. Furthermore, at least some of the BS-RS-based observations obtained, by the communication system of the first BS 170A in step 1108A, are of the same type as the sensing-based observations that may be determined by the LMF 190 on the basis of the sensing-based profiles.

Upon completion of the obtaining (step 1108A) of the BS-RS-based observations, the first BS 170A transmits the BS-RS-based observations to the location management function 190. The location management function 190 obtains (step 1109A) the BS-RS-based observations.

The second BS 170B transmits a DL-RS that may be received by the first UE 110A and the second UE 110B. The DL reference signal may be a high-power wideband signal.

Each UE 110 is, according to aspects of the present application, configured to receive the DL-RS and generate a UL-RS. Each UE 110 then transmits the UL-RS to the second BS 170B.

The communication system of the second BS 170B receives the UL-RS from each UE 110. Conveniently, as discussed hereinbefore, the UL-RS includes identity information for the UE 110 at which the UL-RS has been generated. Responsive to receiving the UL-RS, the communication system of the second BS 170B obtains (step 1108B) BS-RS-based observations. On the basis of a particular BS-RS-based observation, the communication system may determine the identity information for the UE 110 and associate the identity information with the particular BS-RS-based observation.

At least some of the BS-RS-based observations obtained, by the communication system of the second BS 170B in step 1108B, are from the same UE 110 as at least some of the sensing-based profiles obtained, by the sensing system of the second BS 170B, in step 1006B. Furthermore, at least some of the BS-RS-based observations obtained, by the communication system of the first BS 170B in step 1108B, are of the same type as the sensing-based observations that may be determined by the LMF 190 on the basis of the sensing-based profiles.

Upon completion of the obtaining (step 1108B) of the BS-RS-based profiles, the second BS 170B transmits the BS-RS-based profiles to the location management function 190. The location management function 190 obtains (step 1109B) the BS-RS-based profiles.

The third BS 170C transmits a DL-RS that may be received by the first UE 110A and the second UE 110B. The DL reference signal may be a high-power wideband signal. Each UE 110 is, according to aspects of the present application, configured to receive the DL-RS and generate a UL-RS. Each UE 110 then transmits the UL-RS to the third BS 170C.

The communication system of the third BS 170C receives the UL-RS from each UE 110. Conveniently, as discussed hereinbefore, the UL-RS includes identity information for the UE 110 at which the UL-RS has been generated. Responsive to receiving the UL-RS, the communication system of the third BS 170C obtains (step 1108C) BS-RS-based observations. On the basis of a particular BS-RS-based observation, the communication system may determine the identity information for the UE 110 and associate the identity information with the particular BS-RS-based observation.

At least some of the BS-RS-based observations obtained, by the communication system of the third BS 170C in step 1108C, are from the same UE 110 as at least some of the sensing-based profiles obtained, by the sensing system of the third BS 170C, in step 1006C. Furthermore, at least some of the BS-RS-based observations obtained, by the communication system of the first BS 170C in step 1108C, are of the same type as the sensing-based observations that may be determined by the LMF 190 on the basis of the sensing-based profiles.

Upon completion of the obtaining (step 1108C) of the BS-RS-based observations, the third BS 170C transmits the BS-RS-based observations to the location management function 190. The location management function 190 obtains (step 1109C) the BS-RS-based observations.

Figure 12:
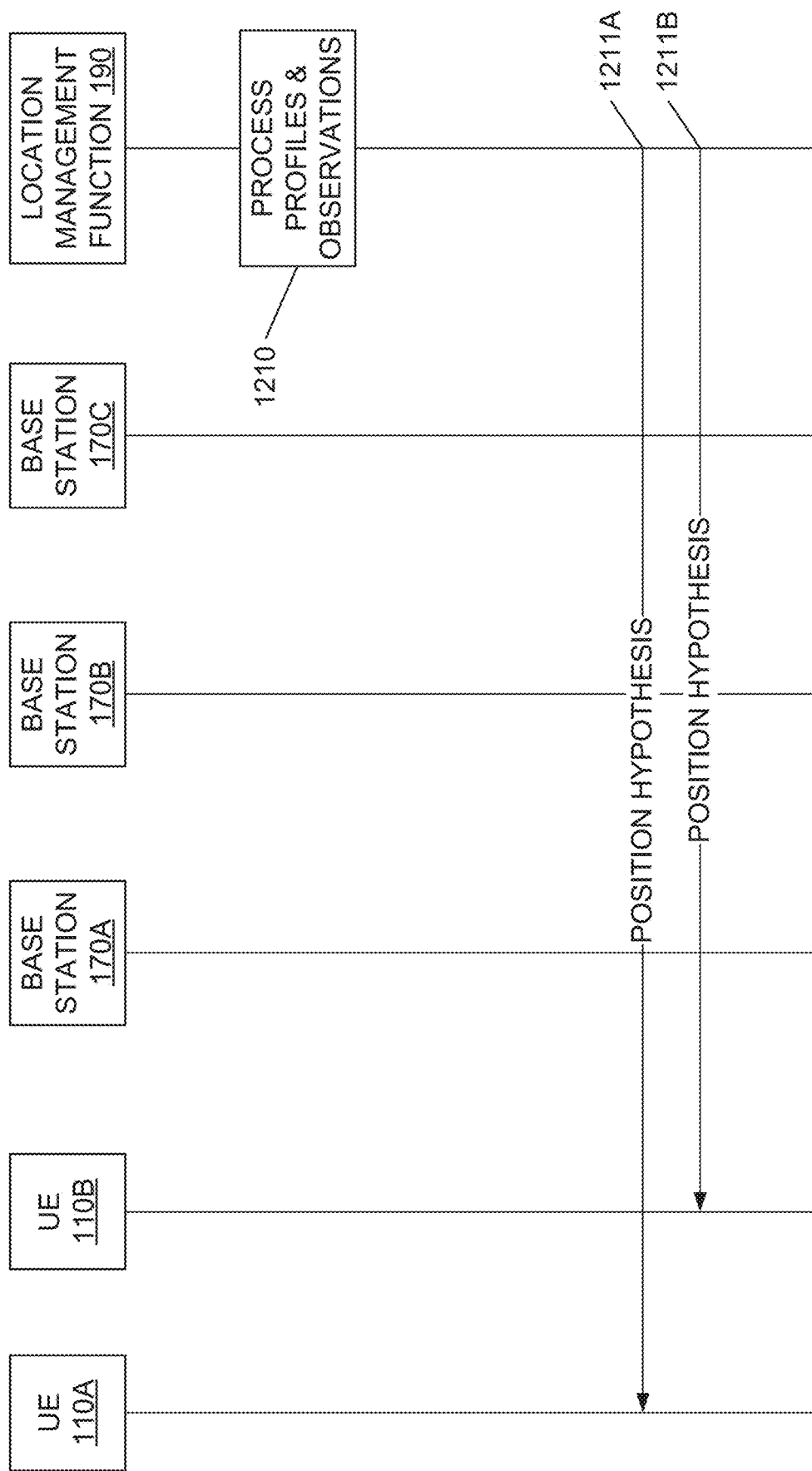
FIG. 12 illustrates, in a flow diagram, observation processing episode and location indication episode interaction between elements of the network of FIG. 1, including three base stations, two user equipments and the location management function, in accordance with aspects of the present application.

In a flow diagram in FIG. 12, observation processing episode and location indication episode interaction is illustrated between the first base station 170A, the second base station 170B, the third base station 170C, the first UE 110A, the second UE 110B and the location management function 190. Although not specifically illustrated, the first base station 170A, the second base station 170B and the third base station 170C may be understood to include a sensor system similar to the sensor system 502 in FIG. 5. Although not specifically illustrated, the first base station 170A, the second base station 170B and the third base station 170C may be understood to include a communication system similar to the communication system 504 in FIG. 5.

The flow diagram of FIG. 12 may be considered to be a continuation of the flow diagram of FIG. 8.

The location management function 190 processes (step 1210) the sensing-based profiles, obtained in steps 1007A, 1007B and 1007C, as part of deriving a plurality of sensing-based position hypothesis vectors. The processing (step 1210) of the sensing-based profiles may include a decluttering, which decluttering may be accomplished, in one aspect, by way of a Doppler analysis. The location management function 190 may use Doppler analysis to separate echoes from the (mobile) UEs 110, which echoes may be regarded as foreground signals, from echoes from (static) clutter in the environment, which echoes may be regarded as background signals.

The location management function 190 also processes (step 1210) the BS-RS-based observations, obtained in steps 1109A, 1109B and 1109C, to determine, from the BS-RS-based observations, UE identity information and an RS-based position hypothesis vector for the UE 110.

On the basis of the same observations, the processing (step 1210), by the location management function 190, may lead to a matching of a certain position hypothesis vector among the RS-based position hypothesis vectors to a certain position hypothesis vector among the sensing-based position hypothesis vectors. Notably, since the sensing-based position hypothesis vectors may be considered to be more accurate than the RS-based position hypothesis vectors and the RS-based position hypothesis vectors are associated with UE identity information, the matching (step 1210) may be used to associate a first UE sensing-based position hypothesis vector with first UE identity information obtained from RS-based observations and a second UE sensing-based position hypothesis vector with second UE identity information obtained from RS-based observations.

The location management function 190 may then transmit (step 1211A), to the first UE 110A associated with the first UE identity information, an indication of the first UE sensing-based position hypothesis vector. The location management function 190 may also transmit (step 1211B), to the second UE 110B associated with the second UE identity information, an indication of the second UE sensing-based position hypothesis vector. Notably, indication of the position is not necessarily intended for transmission (step 1211A, 1211B) to the UEs 110. Instead, the indication of the position can be used for other tasks. The other tasks include predicting future mobility of the UEs 110. The other tasks include management of beams transmitted from the BS 170. Beam management is discussed hereinafter.

Figure 13:
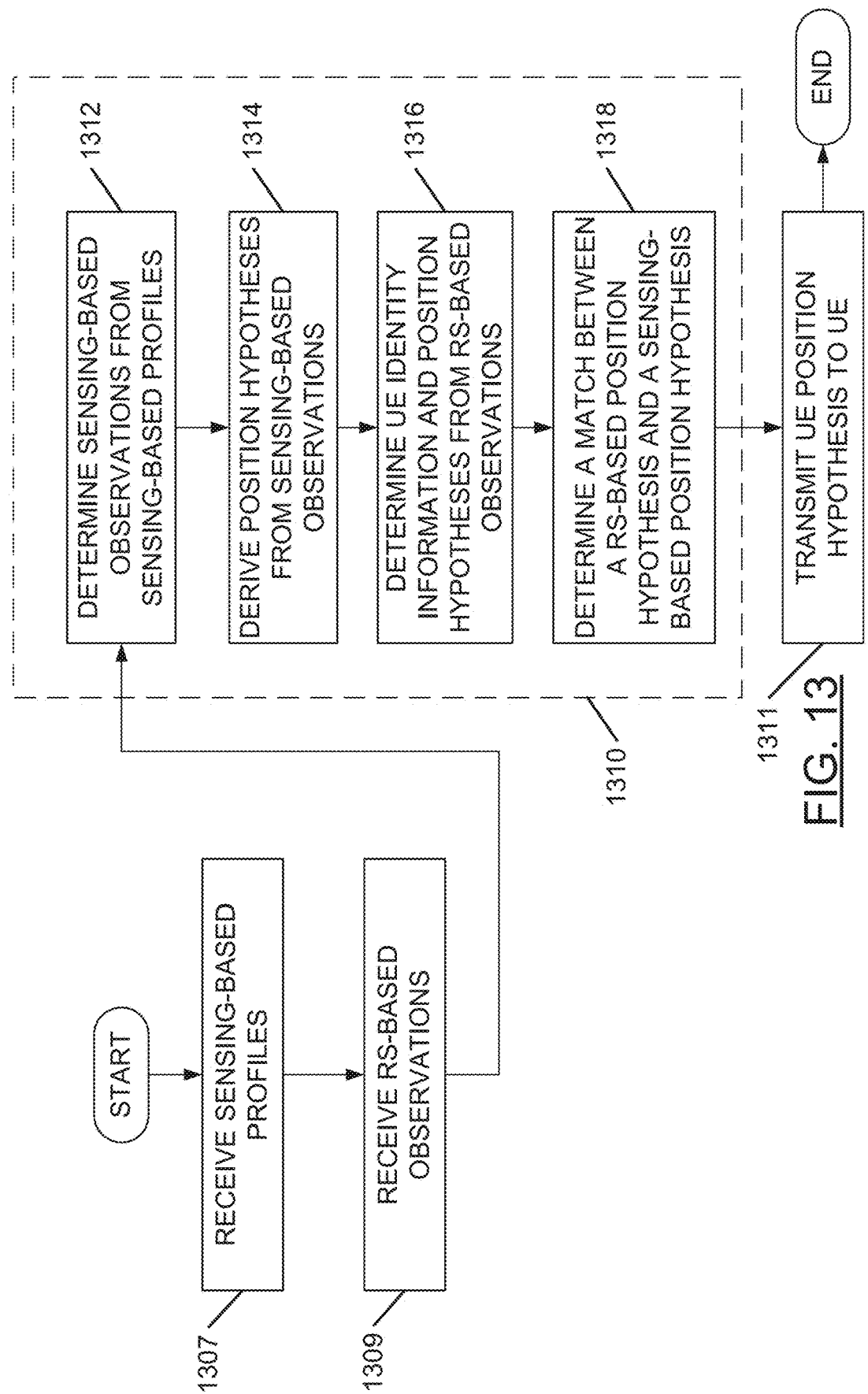
FIG. 13 illustrates example steps in a method of operating the location management function, in accordance with aspects of the present application

FIG. 13 illustrates example steps in a method of operating the LMF 190. The method of FIG. 13 begins with the LMF 190 obtaining (step 1307) sensing-based profiles. In the context of FIG. 10, the obtaining (step 1307) of the sensing-based profiles may be found in the obtaining steps 1007A, 1007B and 1007C. The LMF 190 also obtains (step 1309) RS-based observations. In the context of FIG. 11, the obtaining (step 1309) of RS-based observations may be found in the obtaining steps 1009A, 1009B and 1009C. The LMF 190 processes (step 1310) the sensing-based profiles, obtained in step 1307 and the BS-RS-based observations, obtained in step 1309, to determine a plurality of sensing-based position hypothesis vectors, a plurality of RS-based position hypothesis vectors and to associate a selected sensing-based position hypothesis vector with UE identity information for each UE 110. The location management function 190 may then transmit (step 1311), to the UEs 110 associated with distinct UE identity information, an indication of the respective selected sensing-based position hypothesis vector.

As illustrated in FIG. 13, the step of processing (step 1310) the profiles and observations includes multiple substeps. Processing (step 1310) the observations includes determining (step 1312) sensing-based observations on the basis of the sensing-based profiles and deriving (step 1314), from the sensing-based observations, sensing-based position hypothesis vector. Furthermore, processing (step 1310) the observations includes determining (step 1316), from the reference-signal-based observations, RS-based position hypothesis vectors and UE identity information for each UE 110. Even further, processing (step 1310) the observations includes determining (step 1318) a match between a certain sensing-based position hypothesis vector and a certain RS-based position hypothesis vector.

The deriving (step 1314), from the sensing-based observations, sensing-based position hypothesis vectors may be considered in more detail in view of an example.

As discussed hereinbefore, sensing-based observations may be determined (step 1312) on the basis of obtained (step 1307) sensing-based profiles.

Consider that: the sensing-based PDP received, at the LMF 190, from the first BS 170A has peaks at 4 μs and 6 μs; the sensing-based PDP received, at the LMF 190, from the second BS 170B has peaks at 2 μs and 3.5 ρs; and the sensing-based PDP received, at the LMF 190, from the third BS 170C has peaks at 1 μs and 3 μs. The LMF 190 may appoint the third BS 170C as the temporal reference. The LMF 190 may implement a subtraction of time-axis values, {1, 3}, associated with the peaks of the sensing-based PDP of the third BS 170C from time-axis values, {4, 6}, associated with the peaks of the sensing-based PDPs of the other two BSs 170. The set of two RTT time-axis values associated with the peaks in the sensing-based PDP for the first BS 170A may be converted to a difference vector of four RTTDoA scalar values by the subtraction, {4−1, 4−3, 6−1, 6−3}={3, 1, 5, 3} and this difference vector of four RTTDoA scalar values may be associated with the first BS 170A. Similarly, the set of two RTT time-axis values associated with the peaks in the sensing-based PDP for the second BS 170B may be converted to a difference vector of four RTTDoA scalar values by the subtraction, {2−1, 2−3, 3.5−1, 3.5−3}={1, −1, 2.5, 0.5} and this difference vector of four RTTDoA scalar values may be associated with the second BS 170B.

The LMF 190 may then generate a plurality of sensing-based position hypothesis vectors, with each sensing-based position hypothesis vector having the potential to correspond to a position of one of the UEs 110. Each sensing-based position hypothesis vector may be generated by selecting one RTTDoA scalar value from the difference vector associated with the first BS 170A and one RTTDoA scalar value from the difference vector associated with the second BS 170B. Consequently, for the present example with four RTTDoA scalar values, 16 position hypothesis vectors may be generated in this manner.

As discussed hereinbefore, step 1318 involves determining a match between a certain sensing-based position hypothesis vector and a certain RS-based position hypothesis vector. Since the sensing-based observations have been organized into 16 sensing-based position hypothesis vectors based on sensing-based RTTDoA scalar values, the LMF 190 may also arrange the RS-based observations, obtained in step 1309, into RS-based position hypothesis vectors based on RS-based RTTDoA scalar values.

The LMF 190 may obtain a first RS-based RTTDoA scalar value for the first UE 110A by subtracting an RS-based RTT observation of the first UE 110A received from the third BS 170C from an RS-based RTT observation of the first UE 110A received from the first BS 170A.

The LMF 190 may obtain a second RS-based RTTDoA scalar value for the first UE 110A by subtracting an RS-based RTT observation of the first UE 110A received from the third BS 170C from an RS-based RTT observation of the first UE 110A received from the second BS 170B.

The first and second RS-based RTTDoA scalar values for the first UE 110A may be used to form an RS-based position hypothesis vector for the first UE 110A.

The LMF 190 may obtain a first RS-based RTTDoA scalar value for the second UE 110B by subtracting an RS-based RTT observation of the second UE 110B received from the third BS 170C from an RS-based RTT observation of the second UE 110B received from the first BS 170A.

The LMF 190 may obtain a second RS-based RTTDoA scalar value for the second UE 110B by subtracting an RS-based RTT observation of the second UE 110B received from the third BS 170C from an RS-based RTT observation of the second UE 110B received from the second BS 170B.

The first and second RS-based RTTDoA scalar values for the second UE 110B may be used to form an RS-based position hypothesis vector for the second UE 110B.

Before determining a match between a certain sensing-based position hypothesis vector and a certain RS-based position hypothesis vector, the LMF 190 may act to filter, out of the 16 sensing-based position hypothesis vectors, those sensing-based position hypothesis vectors that are determined to be irrelevant.

Such filtering may be considered to shrink the space of hypotheses. For instance, there may be a map (or well-defined boundaries) of a deployment area in which the UEs 110 may be found. Some of the 16 sensing-based position hypothesis vectors may be found to be outside the deployment area and, accordingly, may be filtered out as irrelevant. Some of the 16 sensing-based position hypothesis vectors may be found to relate to locations that are associated with a low probability and, accordingly, may be filtered out as irrelevant. It is also possible to filter out some of the sensing-based position hypothesis vectors based on a priori information available for individual UEs 110. The a priori information may include a previous location of a UE 110, a mobility pattern of a UE 110, etc.

Notably, the accuracy of each position hypothesis vector may be considered to be tied directly to degree to which a correct match is found between sensing-based position hypothesis vectors and RS-based position hypothesis vectors. Strategies for reducing position error include increasing the size of each position hypothesis vector.

One manner in which the size of the position hypothesis vector can be increased involves including more features in the position hypothesis vector obtained (step 1008) at a single BS 170. Example features for including in the position hypothesis vector may include: packing range; angle; and power.

Another manner in which the size of the position hypothesis vector can be increased involves concatenating features observed at several BSs 170 into a single, large position hypothesis vector.

Advantageously, in a higher dimensional space, there is greater distance (e.g., Euclidian distance) between points that are representative of both the sensing-based observations and the RS-based observations. Accordingly, a match, in the higher dimensional space, between a particular sensing-based position hypothesis vector and a particular RS-based position hypothesis vector may be found with a reduced error probability.

As has been discussed hereinbefore, error probability in finding a match between a particular sensing-based position hypothesis vector and a particular RS-based position hypothesis vector may be reduced by increasing the size of the position hypothesis vector. The increase may be implemented by including more features for a single BS. Such features may include packing range, angle and power. The increase may also be implemented by concatenating features from several BSs in a single, large position hypothesis vector. One way or the other, the general idea is to take the association problem to a higher dimensional space where the distance (e.g., the Euclidian distance) between points is likely to be larger.

Figure 14:
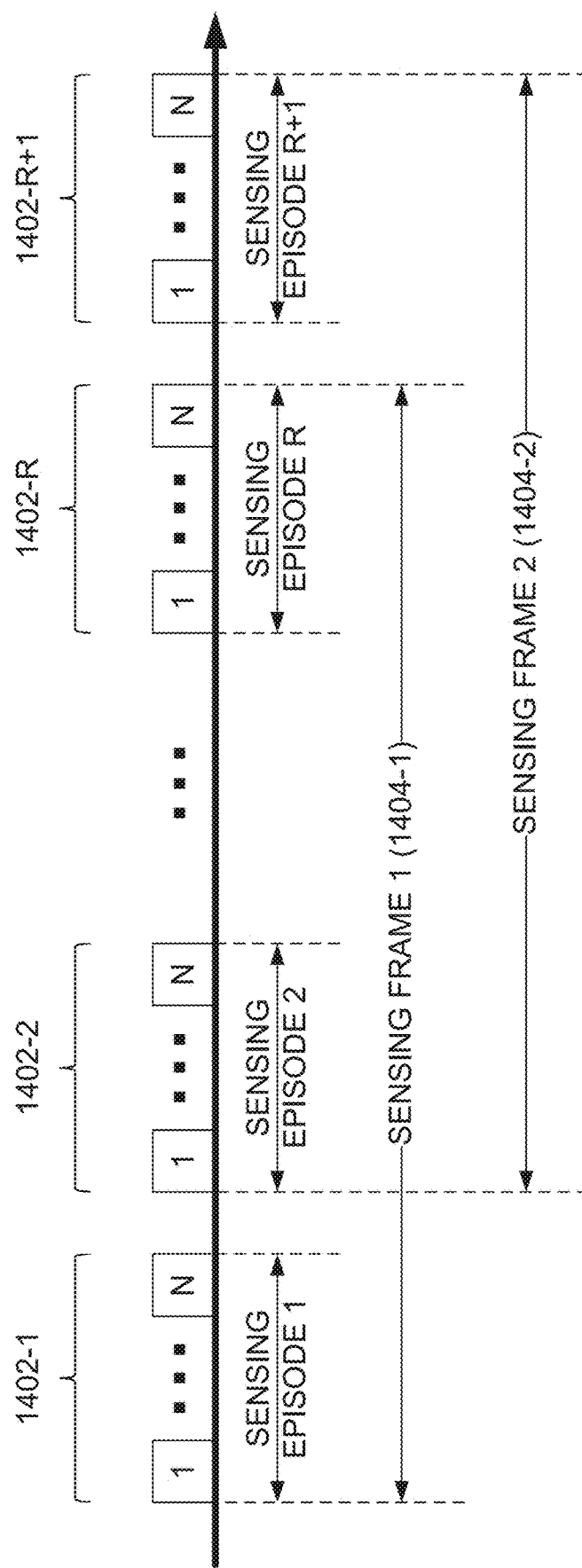
FIG. 14 illustrates that a first sensing episode may include a plurality of observations and that, according to aspects of the present application, a sensing frame may be formed from plurality of observations.

FIG. 14 illustrates that a first sensing episode 1402-1 may include a plurality of observations. In the illustrated example, the plurality includes N observations. A second sensing episode 1402-2 also includes N observations. Additionally, an $R^{th}$ sensing episode 1402-R includes N observations. Furthermore, an $(R+1)^{th}$ sensing episode 1402-R+1 includes N observations.

Increasing the dimension of the position hypothesis vector is also possible by conglomerating observations in time. Concretely, the LMF 190 may concatenate the observations from the current episode and several previous episodes to form a longer position hypothesis vector.

In FIG. 14, the current episode is referenced as the $R^{th}$ sensing episode 1402-R. The LMF 190 may designate a first sensing frame 1404-1 as including the $R^{th}$ sensing episode 1402-R and previous episodes, including the first sensing episode 1402-1 and the second sensing episode 1402-2. The LMF 190 may then concatenate all of the (R×N) observations in the first sensing frame 1404-1 to form a first position hypothesis vector. The LMF 190 may designate a second sensing frame 1404-2 as including the $(R+1)^{th}$ sensing episode 1402-R+1 and previous episodes, including the second sensing episode 1402-2 and the $R^{th}$ sensing episode 1402-R. The LMF 190 may then concatenate all of the (R×N) observations in the second sensing frame 1404-2 to form a second position hypothesis vector.

Notably, working with several consecutive sensing episodes does not mean that an inter-positioning interval will be longer, which would lead to UEs 110 being localized on a less frequent basis such that there is a location estimation delay. Instead, it may be considered that localization still happens responsive to every sensing episode 1402. The concatenation of observations collected in a sensing frame 1404 that includes multiple sensing episodes may be considered to relate to a so-called "sliding window."

The UEs 110 may provide some assistance to processing of the profiles and observations carried out at the LMF 190.

Indeed, the UEs 110 may be configured to detect a sensing signal (e.g., the radar pulse) received from the sensor system 502 of the BS 170 and do something with the detected signal. It is known for sensing signals to be transmitted with a relatively high power and with a relatively wide frequency band. Due to these characteristics, sensing signals often appear, to a UE 110, as white noise. An example high-power, wideband sensing signal is used in pulsed-radar. However, there are other types of sensing signal, such as the type of sensing signal used in pulse-compression frequency modulated continuous wave (FMCW) radar. The type of sensing signal used in pulse-compression FMCW is known to allow a UE 110 to detect the presence of the sensing signal.

Notably, detecting a sensing signal should be recognized as being separate from decoding a sensing signal. A UE 110 might be capable of detecting the presence of a sensing signal by checking whether a signature can be found in raw samples output from an analog-to-digital converter. For one example, a UE 110 may recognize cyclic behavior in the phase of the sensing signal. For another example, a UE 110 may detect patterns in power fluctuations. The same UE 110 may be incapable of estimating small-scale parameters from the sensing signal, where estimating such parameters depends on calibration of specific components.

Figure 15:
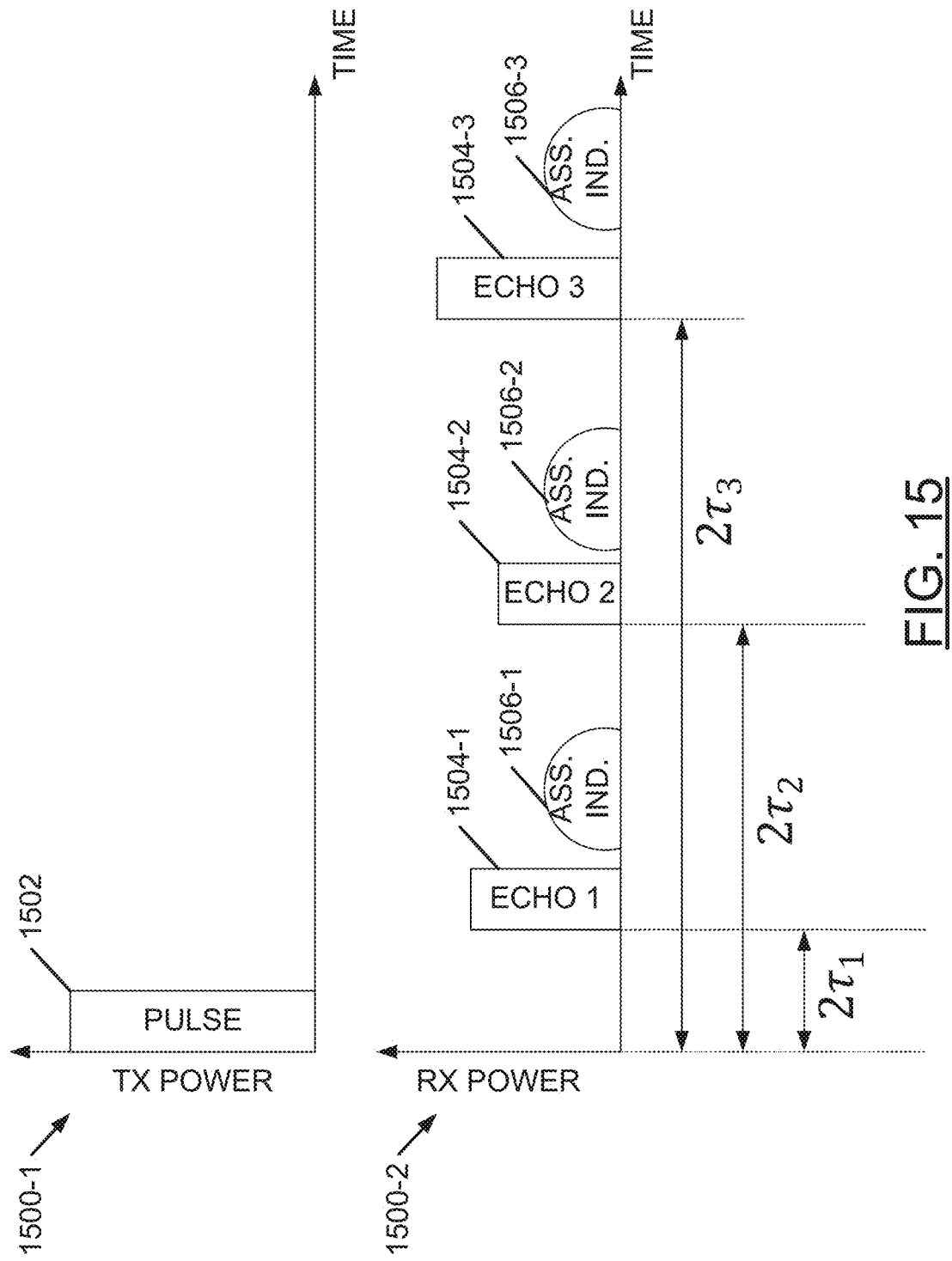
FIG. 15 illustrates a first plot of transmitted power against time for the base station of FIG. 1 and a second plot of received power against time for the base station of FIG. 1, according to aspects of the present application.

FIG. 15 illustrates a first plot 1500-1 of transmitted power against time for the BS 170 and a second plot 1500-2 of received power against time for the BS 170. The first plot 1500-1 illustrates transmission of a sensing pulse 1502.

At each UE 110 among three UEs 110, the sensing pulse 1502 results in an echo signal 1504, as would be expected. The first UE 110A causes a first echo signal 1504-1. The second UE 110B causes a second echo signal 1504-2. The third UE 110C causes a third echo signal 1504-3.

Additionally, however, at each UE 110 among three UEs 110, the sensing pulse 1502 is detected. Responsive to the detecting, each UE transmits a wideband UE association indicator 1506. The first UE 110A transmits a first uplink (UL) UE association indicator 1506-1. The second UE 110B transmits a second UL UE association indicator 1506-2. The third UE 110C transmits a third UL UE association indicator 1506-3. Each UL UE association indicator 1506 may include identity information for the UE 110 that transmits the UL UE association indicator 1506. Accordingly, the UL UE association indicator 1506 may be seen to assist the LMF 190 to associate the echo signal 1504 received just before the UL UE association indicator 1506 with the identity of the UE 110 included in the UL UE association indicator 1506.

If the UL UE association indicator 1506 is transmitted quickly enough, by the UE 110, and with a wide enough frequency band, there is a high chance that the UE association indicator 1506 will arrive, at the BS 170, between two echo signals 1504, as illustrated in FIG. 15.

Figure 16:
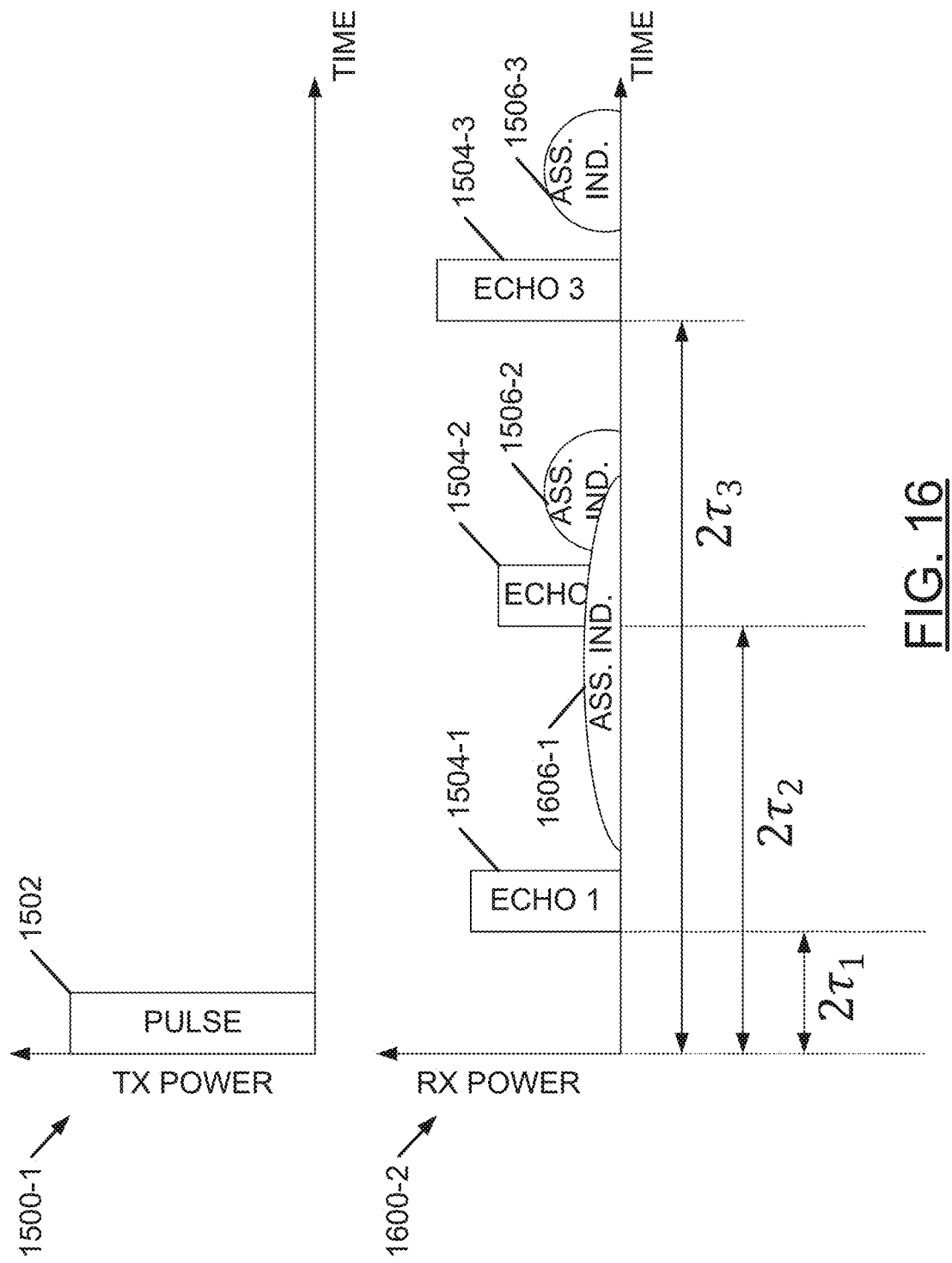
FIG. 16 illustrates the first plot of transmitted power against time for the base station of FIG. 15 and a second plot of received power against time for the base station of FIG. 1, according to aspects of the present application.

FIG. 16 illustrates the first plot 1500-1 of FIG. 15 and a second plot 1600-2 of received power against time for the BS 170, similar to the second plot 1500-2 of FIG. 15. The echo signals 1504 of second plot 1500-2 of FIG. 15 are repeated in the second plot 1600-2 of FIG. 16. When the first UE 110A transmits a first UE association indicator 1606-1, the first UE association indicator 1606-1 is not wideband. Accordingly, the second plot 1600-2 of FIG. 16 illustrates that a temporal portion of the first UE association indicator 1606-1 may be received by the BS 170 after the BS 170 has received the second echo signal 1504-2.

Even in the situation illustrated in FIG. 16, the first UE association indicator 1606-1 may be seen to assist the LMF 190 to filter out some of the association possibilities.

With this background in mind, those UEs 100 that detect the presence of the sensing signal 1502, can immediately transmit respective UL UE association indicators 1506 to the BS 170. Since the goal is to incorporate the UL UE association indicator 1506 into the association process, the UL UE association indicator 1506 sent by the UE 110 and received at the BS 170 may be subject to an expectation that the UL UE association indicator 1506 be received between receipt of the echo signal 1504 backscattered from that UE 110 and the echo signal 1504 backscattered from the next closest UE 110. Meeting such an expectation depends on the density of UEs 110 with the network, the average inter-echo-signal arrival time period and a processing delay at the UE 110. The processing delay at the UE 110 may be measured from the moment a signature is sensed in the received pulse 1502 until the UL UE association indicator 1506 is transmitted.

Clearly, UEs 110 cannot wait for a network entity to preschedule UL grant (e.g., through downlink control information or a physical downlink control channel) so that UL UE association indicators 1506 can be transmitted, since scheduling a UE for the most immediate time slot takes, on average, a few hundreds of microseconds, during which echo signals 1504 from even the farthest UE 110 has already arrived at the BS 170. Instead, the UE 110 is prompted to transmit the UL UE association indicator 1506 as soon as a signature is detected by that UE 110. The UE 110 does not wait for the beginning of frame/sub-frame/slot boundary to initiate the transmission of the UL UE association indicator 1506. As one example, a mechanism similar to carrier-sense multiple access in Wi-Fi (without collision avoidance) may be a candidate. As another example, a technique based on code-division multiple access may be a candidate. As another example, UEs 110 may transmit UL UE association indicators in the analog domain returning the received analog signal on-the-fly to the BS 170 (with slight modification to, thereby, leave a unique signature) without passing the received analog signal through to the digital domain and/or the baseband domain for decoding, etc.

Figure 17:
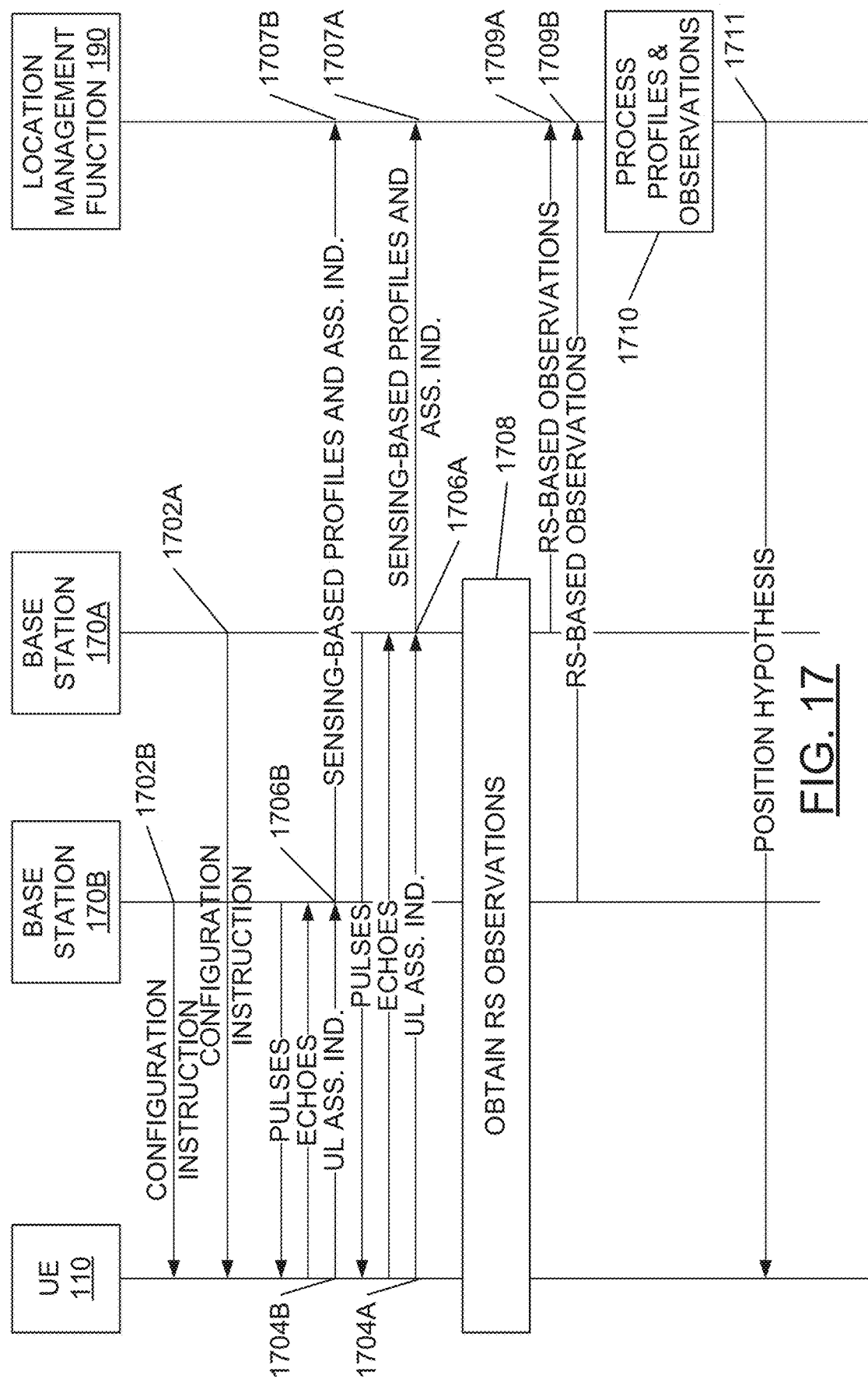
FIG. 17 illustrates, in a signal flow diagram, some of the signaling involved in realizing the mechanism described hereinbefore wherein the user equipments are configured to transmit uplink UE association indicators, according to aspects of the present application.

FIG. 17 illustrates, in a signal flow diagram, some of the signaling involved in realizing the mechanism described hereinbefore wherein UEs 110 are configured to transmit UL UE association indicators. Note that each UE 110 may be assigned an orthogonal code for UL UE association indicator transmission. Accordingly, the codes can be detected by the BS 170 to implicitly understand the identity of the transmitting UE 110. It follows that, in such a case, transmission of UE ID, in the UL UE association indicator, is unnecessary. However, in a case wherein a bundle of UEs share the same orthogonal code or wherein sensing signals are being sent by multiple BSs 170, further information, such as a UE identification and a BS identification, may be included in UL UE association indicators.

It is illustrated in FIG. 17 that the first base station 170A may transmit 1702A configuration instructions to the UE 110. Additionally, the second base station 170B may also transmit 1702B configuration instructions to the UE 110. The configuration information may include UL UE association indicator transmission parameters such as an orthogonal code and a frequency.

A sensing episode may then proceed with the BSs 170 emitting pulses and receiving echoes. The UE 110 may transmit 1704A a UL UE association indicator to the first BS 170A using the configuration instructions received from the first BS 170A. The UE 110 may also transmit 1704B a UL UE association indicator to the second BS 170B using the configuration instructions received from the second BS 170B. Upon receipt of UL UE association indicator, the first BS 170A may provide 1706A a sensing-based profile and information extracted from the UL UE association indicator to the LMF 190. The LMF 190 may obtain 1707A the sensing-based profile and the information extracted from the UL UE association indicator. Upon receipt of UL UE association indicator, the second BS 170B may provide 1706B a sensing profile and information extracted from the UL UE association indicator to the LMF 190. The LMF 190 may obtain 1707B the sensing-based profile and the information extracted from the UL UE association indicator.

A reference signal exchanging episode may then be carried out between the BSs 170 and the UE 110 such that the BSs 170 may obtain 1708 RS-based observations. The LMF 190 may obtain 1709A RS-based observations from the first BS 170A and may obtain 1709B further RS-based observations from the second BS 170B.

The location management function 190 processes (step 1710) the sensing-based profiles, obtained in steps 1707A and 1707B, as part of deriving a plurality of sensing-based position hypothesis vectors. The processing (step 1710) of the sensing-based profiles may include associating the sensing-based profiles with the UE 110 based on the information extracted from the UL UE association indicator.

The location management function 190 also processes (step 1710) the RS-based observations, obtained in steps 1709A and 1709B, to determine, from the RS-based observations, UE identity information and an RS-based position hypothesis vector for the UE 110.

On the basis of the same observations, the processing (step 1710), by the location management function 190, may lead to a matching, with assistance from the information extracted from the UL UE association indicator, of a certain position hypothesis vector among the RS-based position hypothesis vectors to a certain position hypothesis vector among the sensing-based position hypothesis vectors. Notably, since the sensing-based position hypothesis vectors may be considered to be more accurate than the RS-based position hypothesis vectors and the RS-based position hypothesis vectors are associated with UE identity information, the matching (step 1710) may be used to associate a UE sensing-based position hypothesis vector with UE identity information obtained from RS-based observations and a second UE sensing-based position hypothesis vector with second UE identity information obtained from RS-based observations.

The location management function 190 may then transmit (step 1711), to the UE 110 associated with the UE identity information, an indication of the UE sensing-based position hypothesis vector.

As discussed hereinbefore, angle-related measurements (profiles) obtained from the sensing episode may be used to associate an identity with unidentified sensing measurements. Transmitting the sensing signal and reference signals were assumed to be carried out omni-directionally (i.e., without any beamforming) such that estimates of the angle-of-arrival (AoA) of the echoes and AoA measurements of received UL RSs, respectively, allow for an association to take place between an identity and an unidentified sensing measurement.

In general, a sensing subsystem that is capable of estimating AoA (at reception) is also capable of focusing a sensing signal in a given direction within a confined angular sector (at transmission), either through analog beamforming or digital beamforming.

Transmit beamforming may be shown to allow for a reduction of the ambiguity of the association process. The sensing signals may be transmitted within narrow beams. Similarly, the DL reference signals may be transmitted within narrow beams. By narrowing the angle of transmission, the number of candidate position hypotheses is limited. It may be shown that one consequence of limiting the number of candidate position hypotheses is a reduction in the probability of error in step of associating RS-based observations to sensing observations.

It has been described hereinbefore that UL UE association indicators can be transmitted by the UEs 110 in response to detecting a sensing signal. This idea can be extended to the use of transmit beamforming, described above. Consider sensing signals transmitted within narrow beams and consider that the UE 110 may be configured to measure some characteristics of a received sensing signal. Such characteristics may include, for example, a received power of the sensing signal and an identity ("ID") for the beam on which the sensing signal is carried. When formulating an UL UE association indicator for transmission to the BS 170, the UE 110 may include an indication of the ID of the beam. Upon receipt of the UL UE association indicator, the BS 170 may interpret the ID of the beam as an indication of an angular sector of space in which the UE 110 is located. The information available to the BS 170 from UL UE association indicators can be shown to assist the LMF 190 to filter out some of the association possibilities.

In general, it may be shown that there are a variety of practical ways to embed a beam ID in a sensing signal such that UEs 110 of different capabilities are able to detect the sensing signal and extract the beam ID from the sensing signal. Even if such extracting is not possible, there is still an implicit way to force UEs 110 to furnish the LMF 190 with indicators on the sensing signal. The BS 170 can dwell in each beam long enough so that not only echoes from all the UEs 110 within that sector of space are received, but also that the UEs IDs are also received. Based on the returned echoes within each beam, the BS 170 may estimate the angles-of-arrival (AoAs) of prominent peaks in the PAP and associate these estimated AoAs within beam to UEs reporting their IDs within that beam.

To summarize, the only difference between what is proposed in this embodiment and the direction-radar in FIGS. 10, 11 and 12 is the is the manner in which UE identities are associated with the sensing-based $AoA_s$. Here, the connection is through the Beam ID (that is UE ID↔Beam ID↔$AoA_s$), whereas, in FIGS. 10, 11 and 12, the connection is through RS-based $AoA_p$ (that is UE ID↔$AoA_p$ ↔$AoA_s$). notably, it may be considered that there is a tradeoff between the two approaches. If the angular resolution attainable from the RS-based angle estimation is finer than the analog beam-width of the sensing system, then the association problem benefits from the former solution (sending both sensing signals and RS signals). Otherwise, it is beneficial to proceed with the latter solution. It also may be considered that there is another level of tradeoff between the two systems. Beam-sweeping requires sending the sensing signal within numerously many narrow-beams that can be used by all UEs, whereas, the RS-based solution involves each UE 110 transmitting a UL reference signal.

The beam-sweeping approach may be considered to be helpful when it is possible to perform very narrow, 3D (vertical and horizontal) sweeping, since there will be a very little chance that more than one UE falls within a single beam. When this is not the case, ambiguity happens.

Figure 18:
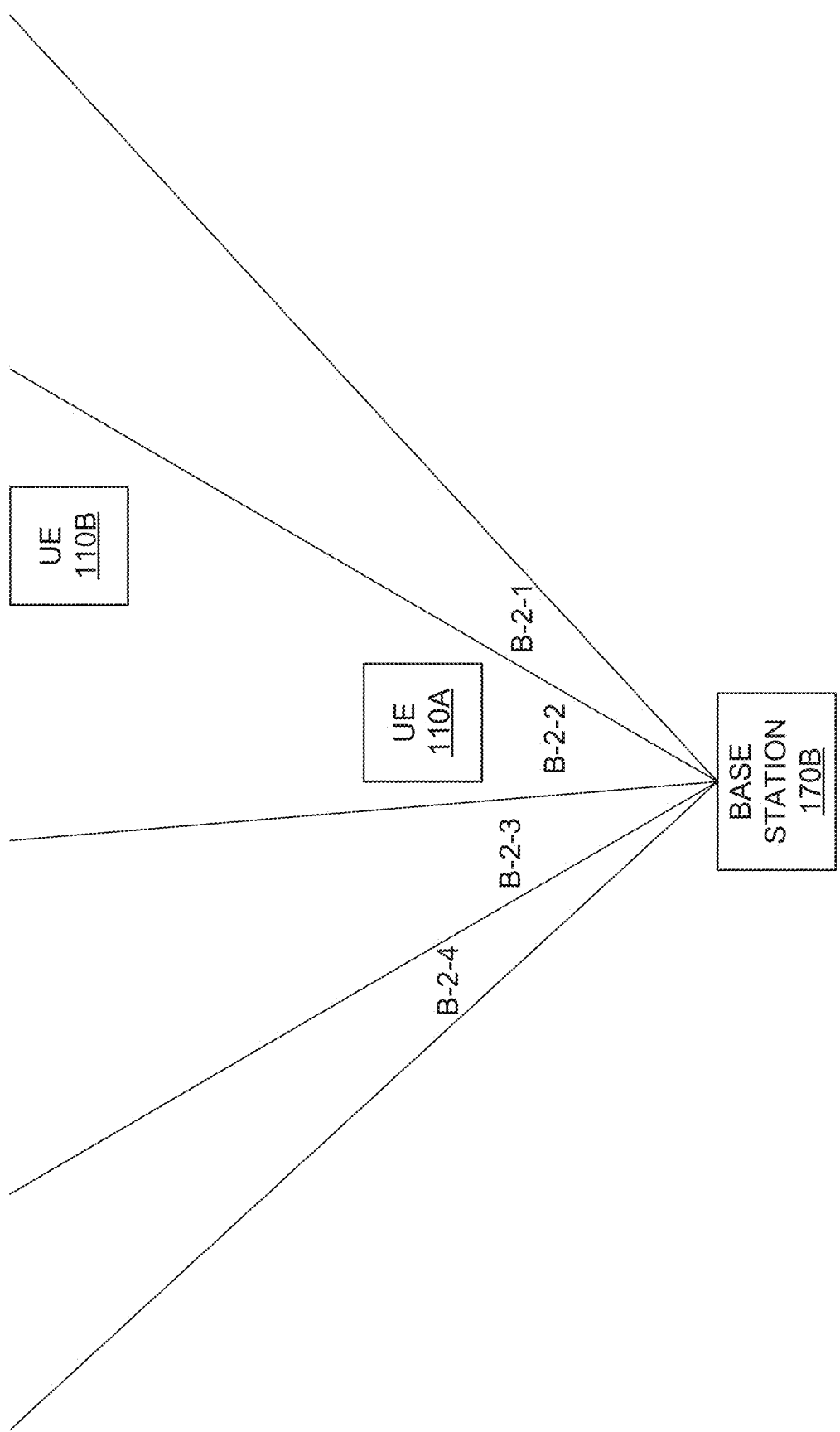
FIG. 18 illustrates a single base station, from FIG. 1, as a source of four beams, according to aspects of the present application.

FIG. 18 illustrates a base station 170B as a source of four beams, labelled as B-2-1, B-2-2, B-2-3 and B-2-4. Two UEs 110 are illustrated, including the first UE 110A and the second UE 110B. Since both UEs are present in the same beam—the beam labelled with beam ID B-2-2—both UEs 110 may be expected to report the same beam ID to the BS 170B along with their respective UE IDs. The BS 170 may provide to the LMF 190 the reporting the BS 170 has received from the two UEs 110. Unfortunately, the LMF 190 obtain no unique information about the relative locations of the UEs from reports of identical beam IDs.

Figure 19:
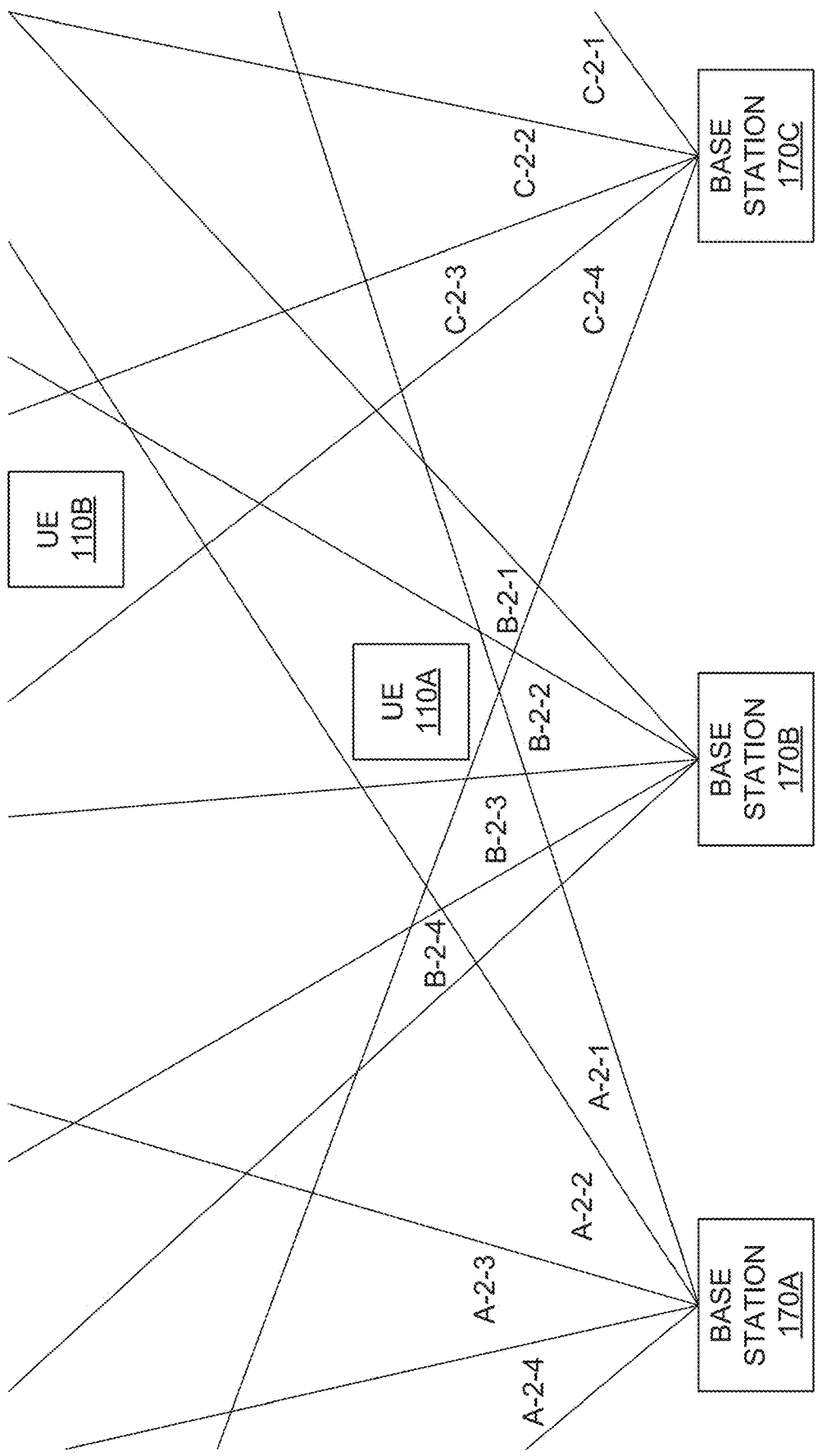
FIG. 19 illustrates a plurality of base stations, where each base station is a source of four beams, according to aspects of the present application.

FIG. 19 illustrates the original base station 170B and the UEs 110 from FIG. 18 along with two further base stations 170A, 170C. A first further base station 170A is a source of four beams, labelled as A-2-1, A-2-2, A-2-3 and A-2-4. A second further base station 170C is a source of four beams, labelled as C-2-1, C-2-2, C-2-3 and C-2-4. In the scenario presented in FIG. 19, the first UE 110A may be expected to report the beam ID B-2-2 to the original BS 170B along with the UE ID for the first UE 110A. Furthermore, the first UE 110A may be expected to report the beam ID A-2-1 to the first further BS 170A along with the UE ID for the first UE 110A and the first UE 110A may be expected to report the beam ID C-2-4 to the second further BS 170C along with the UE ID for the first UE 110A. Additionally, the second UE 110B may be expected to report the beam ID B-2-2 to the original BS 170B along with the UE ID for the second UE 110B. Furthermore, the second UE 110B may be expected to report the beam ID A-2-2 to the first further BS 170A along with the UE ID for the second UE 110B and the first UE 110A may be expected to report the beam ID C-2-3 to the second further BS 170C along with the UE ID for the second UE 110B.

The three BSs 170 may provide, to the LMF 190, the information the BSs 170 have received from the UEs 110. The LMF 190 obtains information indicating that the first UE 110A is in beams with IDS A-2-1, B-2-2 and C-2-4. The LMF 190 also obtains information indicating that the second UE 110B is in beams with IDS A-2-2, B-2-2 and C-2-3. Accordingly, the LMF 190 obtains information that allows for distinctly locating the two UEs 110.

According to aspects of the present application, the LMF 190 may coordinate a sensing signal sweeping pattern for each BS 170 so as to minimize interference, thereby allowing the UEs 110 to distinctly detect beam IDs.

According to aspects of the present application, sensing signals and reference signals are transmitted in a manner similar to the aspects described in the preceding disclosure. In what has been described to this point, the order of the transmission of the sensing signal and the reference signal was immaterial. In this alternative, the sensing signal is transmitted first. From the returned echoes, AoA measurements may be associated with each UE 110 in a plurality of UEs 110.

Information on the angles of arrival for the returned echoes may then be used when transmit-beamforming DL reference signals to the UEs 110. Each UE 110 receives the DL reference signals and estimates an $AoD_p$ value. Each UE 110 then transmits a UL reference signal to the BS 170, with the UL reference signal including the estimated $AoD_p$ and an indication of the UE ID. The LMF 190 may then associate an $AoA_s$ to a received estimated $AoD_p$ based on the UE ID.

According to aspects of the present application, the LMF 190 may schedule receipt, at the BS 170, of the UL reference signal by specifying, to each UE 110, a UL grant.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of indicating a location of a first device, the method comprising:
    obtaining, from a profile origin, a sensing-based profile including a sensing-based observation of the first device;
    obtaining a reference-signal-based observation, the reference-signal-based observation:
        based on receiving, at the first device, a reference signal from a second device; and
        including first device identity information for the first device; and
    outputting an indication of a position hypothesis based on an association between the position hypothesis and the first device identity information;
    wherein the position hypothesis is derived from the sensing-based observation;
    wherein the first device identity information for the first device is obtained from the reference-signal-based observation; and
    wherein the reference-signal-based observation is processed in conjunction with the sensing-based observation to, thereby, determine the association between the position hypothesis and the first device identity information.

2. The method of claim 1 wherein the sensing-based profile comprises geometric range measurements.

3. The method of claim 1 wherein the sensing-based profile comprises angle measurements.

4. The method of claim 1 wherein the reference-signal-based observations are representative of a round trip time from the second device to the first device and back to the second device.

5. The method of claim 1 wherein the sensing-based observations and the reference-signal-based observations each comprise a value representative of a respective angle of arrival.

6. The method of claim 1 wherein the processing comprises employing a Doppler analysis to:
    recognize echoes from the first device and echoes from static clutter; and
    decouple the echoes from the first device and the echoes from static clutter by determining a non-zero velocity for the first device and determining a zero velocity for the static clutter.

7. The method of claim 1 wherein the obtaining the reference-signal-based observation comprises obtaining the reference-signal-based observation from the profile origin.

8. The method of claim 1 further comprising selecting the first device, among a plurality of devices, as a cluster head device.

9. The method of claim 8 further comprising outputting, to each device among the plurality of devices, an indication of a side link communication schedule and an indication of the selection of the first device as the cluster head device.

10. The method of claim 9 further comprising obtaining, from the cluster head device, an indication of a cluster head identifier and a plurality of inter-device measurements.

11. The method of claim 10 further comprising outputting, to the each device among the plurality of devices, a respective position hypothesis for the each device among the plurality of devices, wherein the respective position hypothesis is determined by processing the inter-device measurements in context with the position hypothesis of the cluster head device derived from the sensing-based observation.

12. The method of claim 1 further comprises:
    obtaining, from each profile origin in a plurality of further profile origins, further sensing-based profiles; and
    obtaining, from the each profile origin in the plurality of further profile origins, further reference-signal-based observations.

13. The method of claim 12 wherein the sensing-based profile is representative of angle measurements and the further sensing-based profiles are representative of angle measurements and the method further comprises:
    appointing a profile origin among the plurality of profile origins as a spatial reference; and
    reducing a value of a sensing-based observation received from each profile origin in the plurality of profile origins by a sensing-based observation received from the spatial reference.

14. The method of claim 12 wherein the sensing-based profile is representative of geometric range measurements and the further sensing-based profiles are representative of geometric range measurements and the method further comprises:
    appointing a profile origin among the plurality of profile origins as a temporal reference; and
    reducing a value of a sensing-based observation received from each profile origin in the plurality of profile origins by a sensing-based observation received from the temporal reference.

15. The method of claim 1 further comprising:
    obtaining, from the profile origin, further sensing-based observations; and
    amending the position hypothesis, based on the further sensing-based observations.

16. The method of claim 1 further comprising obtaining, from the profile origin, a further signal, the further signal including an indication of an identity of the first device.

17. The method of claim 1 obtaining, from the profile origin, an indication of an identity for a specific beam in which the first device received a sensing signal.

18. The method of claim 17 obtaining, from a further profile origin, an indication of an identity for a specific beam in which the first device received a further sensing signal.

19. An apparatus comprising:
a memory storing instructions;
a processor caused, by execution of the instructions, to:
  obtain, from a profile origin, a sensing-based profile including a sensing-based observation of a first device;
  obtain a reference-signal-based observation, the reference-signal-based observation:
    based on receiving a reference signal from a second device; and
    including first device identity information for the first device; and
  output an indication of a position hypothesis based on an association between the position hypothesis and the first device identity information;
wherein the position hypothesis is derived from the sensing-based observation;
wherein the first device identity information for the first device is obtained from the reference-signal-based observation; and
wherein the reference-signal-based observation is processed in conjunction with the sensing-based observation to, thereby, determine the association between the position hypothesis and the first device identity information.

20. A non-transitory computer-readable medium storing instructions, the instructions, when executed by a processor adapted for indicating a location of a first device to the first device, causing the processor to:
  obtain, from a profile origin, a sensing-based profile including a sensing-based observation of the first device;
  obtain a reference-signal-based observation, the reference-signal-based observation:
    based on receiving a reference signal from a second device; and
    including first device identity information for the first device; and
  output an indication of a position hypothesis based on an association between the position hypothesis and the first device identity information;
wherein the position hypothesis is derived from the sensing-based observation;
wherein the first device identity information for the first device is obtained from the reference-signal-based observation; and
wherein the reference-signal-based observation is processed in conjunction with the sensing-based observation to, thereby, determine the association between the position hypothesis and the first device identity information.

* * * * *